US012785053B2

(12) United States Patent
Kovarik et al.

(10) Patent No.: US 12,785,053 B2
(45) Date of Patent: Nov. 3, 2026

(54) BUBBLE INTRODUCTION INTO A STEADY-STATE SAMPLE STREAM

(71) Applicant: DH Technologies Development Pte. Ltd., Singapore (SG)

(72) Inventors: Peter Kovarik, Markham (CA); Thomas R. Covey, Newmarket (CA); Bradley B. Schneider, Bradford (CA)

(73) Assignee: DH Technologies Development Pte. Ltd., Singapore (SG)

( * ) Notice: Subject to any disclaimer, the term of this patent is extended or adjusted under 35 U.S.C. 154(b) by 345 days.

(21) Appl. No.: 18/552,685

(22) PCT Filed: Mar. 30, 2022

(86) PCT No.: PCT/IB2022/052958
§ 371 (c)(1),
(2) Date: Sep. 27, 2023

(87) PCT Pub. No.: WO2022/208393
PCT Pub. Date: Oct. 6, 2022

(65) Prior Publication Data

US 2024/0170271 A1 May 23, 2024

Related U.S. Application Data

(60) Provisional application No. 63/167,724, filed on Mar. 30, 2021.

(51) Int. Cl.
*H01J 49/04* (2006.01)
*H01J 49/14* (2006.01)
*H01J 49/16* (2006.01)

(52) U.S. Cl.
CPC ...... *H01J 49/0404* (2013.01); *H01J 49/0431* (2013.01); *H01J 49/145* (2013.01); *H01J 49/165* (2013.01)

(58) Field of Classification Search
CPC .. H01J 49/0404; H01J 49/0431; H01J 49/145; H01J 49/165
See application file for complete search history.

(56) References Cited

U.S. PATENT DOCUMENTS 5,109,840 A 5/1992 Daleiden
5,332,512 A 7/1994 Wells
(Continued)

FOREIGN PATENT DOCUMENTS

CN 102354649 A 2/2012
CN 109844901 A 6/2019
(Continued)

OTHER PUBLICATIONS

Anonymous, "Turbo V Ion Source Operator Guide", AB Sciex Pte, Ltd., Aug. 1, 2015, retrieved from the internet on Mar. 17, 2022 at: https://manualzz.com/doc/7476753/user-guide--turbo-v-ion-source-operator-guide, "TurbolonSpray Probe Optimization", and "Adjust the Electrode Tip Extension", 52 pages.
(Continued)

*Primary Examiner* — Robert H Kim
(74) *Attorney, Agent, or Firm* — Merchant & Gould P.C.

(57) ABSTRACT

A method of analyzing a liquid with a mass analysis device having a bubble generating interface (BGI) and a removal conduit includes aspirating a sample into the removal conduit at an aspira-tion pressure. Concurrently with aspirating the sample at least one operational condition of the BGI is controlled to generate a plurality of bubbles in the sample. Concurrently with aspirating the sample the plurality of bubbles are aspirated into the removal conduit. The sample and the plurality of bubbles are analyzed with the mass analysis device to generate a signal.

20 Claims, 13 Drawing Sheets

(56) References Cited

U.S. PATENT DOCUMENTS

| | | | |
|---|---|---|---|
| 5,691,205 | A | 11/1997 | Kawabata et al. |
| 5,736,741 | A | 4/1998 | Bertsch |
| 5,750,881 | A | 5/1998 | Dorenkott |
| 6,478,238 | B1 | 11/2002 | Wachs |
| 7,923,681 | B2 | 4/2011 | Collings et al. |
| 8,759,753 | B1 | 6/2014 | Di Bussolo |
| 9,134,335 | B2 | 9/2015 | Dehmer |
| 10,770,277 | B2 | 9/2020 | Datwani et al. |
| 11,232,938 | B2 | 1/2022 | Arnold et al. |
| 2002/0048536 | A1 | 4/2002 | Bergh et al. |
| 2003/0122070 | A1 | 7/2003 | Chang |
| 2003/0193020 | A1 | 10/2003 | Van Berkel |
| 2004/0102742 | A1 | 5/2004 | Tuyl |
| 2006/0054805 | A1 | 3/2006 | Flanagan |
| 2007/0039866 | A1 | 2/2007 | Schroeder |
| 2007/0175757 | A1 | 8/2007 | Hanafusa |
| 2010/0181199 | A1 | 7/2010 | Sugiyama |
| 2011/0120867 | A1 | 5/2011 | Mishina |
| 2012/0043206 | A1 | 2/2012 | Molho |
| 2012/0053065 | A1 | 3/2012 | Van Berkel |
| 2012/0079894 | A1 | 4/2012 | Van Berkel et al. |
| 2012/0083045 | A1 | 4/2012 | Van Berkel et al. |
| 2012/0304747 | A1 | 12/2012 | Van Berkel |
| 2013/0023005 | A1 | 1/2013 | Chen et al. |
| 2013/0092166 | A1 | 4/2013 | Pearce |
| 2013/0118498 | A1 | 5/2013 | Robitaille et al. |
| 2013/0294971 | A1 | 11/2013 | Van Berkel et al. |
| 2014/0096624 | A1 | 4/2014 | ElNaggar |
| 2014/0216177 | A1 | 8/2014 | Van Berkel et al. |
| 2014/0283627 | A1 | 9/2014 | Hattingh et al. |
| 2015/0210999 | A1 | 7/2015 | Sahoyama |
| 2015/0318160 | A1 | 11/2015 | Pawliszyn et al. |
| 2015/0340219 | A1 | 11/2015 | Mellors |
| 2015/0360237 | A1 | 12/2015 | Hayes |
| 2016/0126080 | A1 | 5/2016 | Kertesz |
| 2016/0160211 | A1 | 6/2016 | Huge |
| 2016/0266017 | A1 | 9/2016 | Kennedy et al. |
| 2016/0299041 | A1 | 10/2016 | Kertesz |
| 2016/0299109 | A1 | 10/2016 | Van Berkel |
| 2017/0003256 | A1 | 1/2017 | Ziegler |
| 2017/0102359 | A1 | 4/2017 | Yan |
| 2017/0110307 | A1 | 4/2017 | Mellors |
| 2017/0219522 | A1 | 8/2017 | Furtaw |
| 2017/0234841 | A1 | 8/2017 | Van Berkel |
| 2017/0316926 | A1 | 11/2017 | Arnold et al. |
| 2018/0021533 | A1 | 1/2018 | Gausche-Hill et al. |
| 2018/0100839 | A1 | 4/2018 | Van Berkel |
| 2018/0348178 | A1 | 12/2018 | Van Berkel |
| 2019/0072464 | A1 | 3/2019 | Wiederin |
| 2019/0157061 | A1 | 5/2019 | Datwani et al. |
| 2019/0369068 | A1 | 12/2019 | Gentalen |
| 2020/0043712 | A1 | 2/2020 | Arnold et al. |
| 2020/0166490 | A1 | 5/2020 | Wiechers |
| 2020/0251323 | A1 | 8/2020 | Zimmerman |
| 2020/0345968 | A1 | 11/2020 | Merrell et al. |
| 2020/0365382 | A1 | 11/2020 | Arnold et al. |
| 2021/0121905 | A1 | 4/2021 | Covey |
| 2021/0190735 | A1 | 6/2021 | Bonda |
| 2021/0341439 | A1 | 11/2021 | Van Berkel |
| 2023/0184642 | A1 | 6/2023 | Liu |
| 2023/0280351 | A1 | 9/2023 | Iannotti |
| 2023/0349858 | A1 | 11/2023 | Covey |
| 2024/0079225 | A1 | 3/2024 | Covey |
| 2024/0096611 | A1 | 3/2024 | Covey |
| 2024/0112901 | A1 | 4/2024 | Liu |
| 2024/0159716 | A1 | 5/2024 | Cox |
| 2024/0170270 | A1 | 5/2024 | Kovarik |
| 2024/0175787 | A1 | 5/2024 | Tate |
| 2024/0272191 | A1 | 8/2024 | Verma |

FOREIGN PATENT DOCUMENTS

| | | | | |
|---|---|---|---|---|
| CN | 211318299 | | 8/2020 | |
| EP | 0421007 | | 4/1991 | |
| EP | 2443432 | | 4/2012 | |
| JP | H 04-253150 | A | 9/1992 | |
| JP | H 05-045333 | A | 2/1993 | |
| JP | H 08-236064 | A | 9/1996 | |
| JP | H 09-082269 | A | 3/1997 | |
| JP | H 11-317192 | A | 11/1999 | |
| JP | 2003-504183 | A | 1/2001 | |
| JP | 2011007690 | A | 1/2011 | |
| JP | 2012-502296 | A | 1/2012 | |
| JP | 2019-521320 | A | 7/2019 | |
| JP | 2020-500297 | A | 1/2020 | |
| WO | 2010/048339 | | 12/2010 | |
| WO | 2011/146269 | | 11/2011 | |
| WO | 2012/149314 | | 11/2012 | |
| WO | 2013/112914 | | 8/2013 | |
| WO | 2014/140776 | | 9/2014 | |
| WO | 2015/108807 | | 7/2015 | |
| WO | 2015/188282 | | 12/2015 | |
| WO | 2016/164766 | | 10/2016 | |
| WO | 2018/217778 | | 11/2018 | |
| WO | 2019/102350 | | 5/2019 | |
| WO | WO-2019102350 | A1 * | 5/2019 | .......... H01J 49/4215 |
| WO | 2019/126363 | | 6/2019 | |
| WO | 2020/016809 | | 1/2020 | |
| WO | 2020/079647 | | 4/2020 | |
| WO | 2021/234644 | | 11/2021 | |
| WO | 2022/167917 | | 8/2022 | |
| WO | 2022/167980 | | 8/2022 | |
| WO | 2022/172156 | | 8/2022 | |
| WO | 2022/172199 | | 8/2022 | |
| WO | 2022/201037 | | 9/2022 | |
| WO | 2022/208393 | | 10/2022 | |
| WO | 2022/259187 | | 12/2022 | |
| WO | 2024/241262 | | 11/2024 | |

OTHER PUBLICATIONS

Bonvin, Gregoire et al., "Capillary electrophoresis; electrospray ionization-mass spectrometry interfaces: Fundamental concepts and technical developments", Journal of Chromatopgraphy A, vol. 1267, Dec. 1, 2012, pp. 17-31.

Dirico, Kenneth et al., "Ultra-High-Throughput Acoustic Sroplet Ejection-Open Port Interface-Mass Spectrometry for Parallel Medicinal Chemistry", ACS Medicinal Chemistry Letters, vol. 11, No. 6, May 1, 2020, pp. 1101-1110.

Hager, James et al., "Product ion scanning using Q-q-Q linear ion trap (Q Trap) mass spectrometer", Rapid Communications in Mass Spectrometry, 2003; 17: 1056-1064.

Liu, Chang et al., "Operational Modes and Speed Considerations of an Acoustic Droplet Dispenser for Mass Sectrometry", Analytical Chemistry, vol. 92, No. 24, Oct. 16, 2020, pp. 15818-15826.

Maxwell, E. Jane et al., "Decoupling CE and ESI for a more robust interface with MS", Electrophoresis, Verlag-Chemie, Hoboken, USA, vol. 31, No. 7, Mar. 1, 2010, pp. 1130-1137.

PCT International Preliminary Report on Patentability in Application PCT/IB2022/052958, mailed Oct. 12, 2023, 10 pages.

PCT International Search Report and Written Opinion in Application PCT/IB2022/052958, mailed Jun. 20, 2022, 14 pages.

Pei, Jian et al., "Analysis of Samples Stored as Individual Plugs in a Capilaary by Electrspray Ionization Mass Spectrometry", Analytical Chemistry, vol. 81, No. 15, Aug. 1, 2009, pp. 6558-6561.

Pei, Jian et al., "Rapid and Label-Free Screening of Enzyme Inhibitors Using Segmented Flow Electrospray Ionization Mass Spectrometry", Journal of the American Society for Mass Spectrometry, Elsevier, vol. 21, No. 7, Jul. 1, 2010, pp. 1107-1113.

Sciex, Echo MS Core Module User Guide, published by Sciex, RUO-IDV-05-9945-C, Apr. 2020, 51 pages.

Simon, Roman et al., "Acoustic Ejection Mass Spectrometry: A Fully Automatable Technology for High-Throughput Screening in Drug Discovery", Society for Laboratory Automation and Screening, vol. 26, Jul. 26, 2021, pp. 961-973.

Tascon, Marcos et al., "Development of a microfluidic open interface with flow isolated desorption volume for the direct coupling of SPME devices to mass spectrometry", Analytical Chemistry, vol. 90, No. 4, Feb. 1, 2018, pp. 2631-2638.

(56) References Cited

OTHER PUBLICATIONS

Van Berkel et al., Immediate drop on demand technology (I-DOT) coupled with mass spectrometry via an open-port sampling interface, Bioanalysis, vol. 9, No. 21, Nov. 2, 2017, pp. 1667-1679.
Van Berkel, Gary et al., "An open port sampling interface for liquid introduction atmosperic pressure ionization mass spectrometry: Open port sampling interface", Rapid Communications in Mass Spectrometry, vol. 29, No. 19, Oct. 15, 2015, pp. 1749-1756.
Van Berkel, Gary et al., "Combined Falling Drop/Open Port Sampling Interface System for Automated Flow Injection Mass Spectrometry", Analytic Chemistry, 2017, 89, 22, pp. 12578-12586.
Wen, Xiujuan et al., "Direct Analysis from Phase-Separated Liquid Samples using ADE-OPI-MS: Applicability to High-Throughput Screening for Inhibitors of Diacylglycerol Acyltransferase 2", Analytic Chemistry, 2021, 93, 15, 6071-6079.
Zhang, Hui et al., "Acoustic Ejection Mass Spectrometry for High-Throughput Analsis", bioRxiv, Jan. 29, 2020, retrieved from the internet on Sep. 8, 2021 at: https:www.biorxiv.org/content/10.1101/2020.01.28.923938v1.full.pdf, 32 pages.
Zhang, Hui et al., "Acoustic Ejection Mass Spectrometry for High-Throughput Analysis", Analytical Chemistry, Jan. 29, 2020, 12 pages.
Li, Xianjiang et al., "Sampling and analyte enrichment strategies for ambient mass spectrometry", Anal Bioanal Chem (2018), 410:715-724.
Li, Xin-Xin, et al., "Method for Improving Spatial Resolution of Liquid-assisted Surface Desorption Atmospheric Pressure Chemical Ionization Mass Spectrometry", Chinese Journal of Analytical Chemistry, vol. 44, Issue 1, Jan. 2016, pp. 25-31.

* cited by examiner

BUBBLE INTRODUCTION INTO A STEADY-STATE SAMPLE STREAM

CROSS-REFERENCE TO RELATED APPLICATION

This application is a National Stage Application of PCT/IB2022/052958, filed on Mar. 30, 2022, which claims the benefit of U.S. Provisional Patent Application No. 63/167,724, filed on Mar. 30, 2021, the entire disclosures of which are incorporated herein by reference in their entireties. To the extent appropriate, a claim of priority is made to each of the above disclosed applications.

BACKGROUND

High-throughput sample analysis is critical to the drug discovery process. Mass spectrometry (MS) based methods can achieve label-free, universal mass detection of a wide range of analytes with exceptional sensitivity, selectivity, and specificity. As a result, there is significant interest in improving the throughput of MS-based analysis for drug discovery. In particular, a number of sample introduction systems for MS-based analysis have been developed for a variety of applications. An open port interface (OPI) may be used to provide a sample at a steady state, with an ionization device (such as an electrospray ionization (ESI) device) to deliver the sample to a mass analysis device. The performance of the OPI depends on selecting the appropriate operational conditions.

SUMMARY

In one aspect, the technology relates to a method of analyzing a liquid with an analysis system including a mass analysis device and a bubble generating interface (BGI) including a supply conduit, a port inlet, and a removal conduit, the method including: operating the analysis system at a first bubble generation frequency condition including a first liquid inflow rate and a first aspiration pressure, wherein operating the analysis system at the first bubble generation frequency condition includes: delivering the liquid to the BGI through the supply conduit at the first liquid inflow rate, wherein the liquid forms a meniscus proximate the port inlet; aspirating the liquid from the BGI via the removal conduit at the first aspiration pressure, so as to generate a plurality of bubbles in the removal conduit at the first bubble generation frequency; and detecting a signal associated with the liquid and the plurality of bubbles generated at the first bubble generation frequency at the mass analysis device; and operating the analysis system at a second bubble generation frequency condition different than the first bubble generation frequency condition, wherein operating the analysis system at the second bubble generation frequency condition includes: detecting a signal associated with the liquid and the plurality of bubbles generated at the second bubble generation frequency at the mass analysis device. In an example, prior to operating the analysis system at the second bubble generation frequency condition, performing at least one of: delivering the liquid to the BGI at a second flow rate; aspirating the liquid from the BGI via the removal conduit at a second aspiration pressure; and adjusting a separation distance between the port inlet and the removal conduit. In another example, the meniscus extends into a removal conduit. In yet another example, the liquid includes a sample. In still another example, the method further includes, after detecting the signal associated with the liquid and the plurality of bubbles generated at the first bubble generation frequency condition, displaying the signal.

In another example of the above aspect, the method further includes identifying a characteristic in the signal, wherein the characteristic includes at least one of a signal frequency, a signal pattern, a signal intensity, a noise. In an example, the method further includes associating the characteristic with at least one of a plurality of sample sources.

In another aspect, the technology relates to a method of analyzing a liquid with a mass analysis device including a bubble generating interface (BGI) including a removal conduit, the method including: aspirating a sample into the removal conduit at an aspiration pressure; concurrently with aspirating the sample, controlling at least one operational condition of the BGI to generate a plurality of bubbles in the sample; concurrently with aspirating the sample, aspirating the plurality of bubbles into the removal conduit; and analyzing the sample and the plurality of bubbles with the mass analysis device to generate a signal. In an example, the plurality of aspirated bubbles are aspirated at a uniform frequency. In another example, analyzing the sample and the bubbles includes identifying a characteristic in the signal, wherein the characteristic includes at least one of a signal frequency, a signal pattern, signal intensity, a noise. In yet another example, controlling at least one operational condition of the BGI includes adjusting at least one of the aspiration pressure at the BGI, a liquid inflow rate of the sample to the BGI, a distance between a BGI port inlet and the removal conduit, the BGI port inlet diameter, the removal conduit diameter, and the BGI material. In still another example, the bubbles are aspirated through a port inlet of the BGI.

In another example of the above aspect, the method further includes introducing the sample into the BGI through an inlet discrete from the port inlet. In an example, the discrete inlet includes a plurality of discrete inlets and the sample includes a plurality of samples. In another example, the method further includes, prior to analyzing the sample and the plurality of bubbles, ionizing the sample utilizing at least one of electrospray ionization and atmospheric-pressure chemical ionization.

In another aspect, the technology relates to an apparatus including: a bubble generating interface (BGI) including a port inlet and a removal conduit; an ionization device communicatively coupled to the BGI; a mass analysis device disposed proximate the ionization device; at least one processor; and a memory storing instructions that, when executed by the at least one processor, cause the apparatus to perform operations including: aspirating a sample into the removal conduit at an aspiration pressure; concurrently with aspirating the sample, controlling at least one operational condition of the BGI to generate a plurality of bubbles in the sample; concurrently with aspirating the sample, aspirating the plurality of bubbles into the removal conduit, wherein the plurality of bubbles are aspirated at an aspiration frequency; and analyzing the sample and the plurality of bubbles with the mass analysis device to generate a signal. In an example, the BGI includes a plurality of BGIs and the ionization device includes a plurality of ionization devices. In another example, the ionization device includes both of an electrospray ionization device and an atmospheric-pressure chemical ionization device. In yet another example, a separation distance between the port inlet and the removal conduit is adjustable. In still another example, the apparatus further includes means for adjusting the aspiration frequency.

In another example of the above aspect, the operations further include adjusting the aspiration frequency.

In another aspect, the technology relates to a bubble generating interface (BGI) in communication with a mass analysis device, the BGI including: an outer body having a sample inlet communicatively coupled to the outer body and a port inlet discrete from the sample inlet; and a removal conduit disposed in the outer body and communicatively coupled to an outlet, wherein application of an aspiration pressure to the removal conduit draws a gas into the port inlet and the removal conduit, wherein at least one of: (a) a geometry of the port inlet is adjustable; (b) a geometry of the removal conduit is adjustable; and (c) a separation distance between the port inlet and the removal conduit is adjustable.

DETAILED DESCRIPTION

Figure 1:
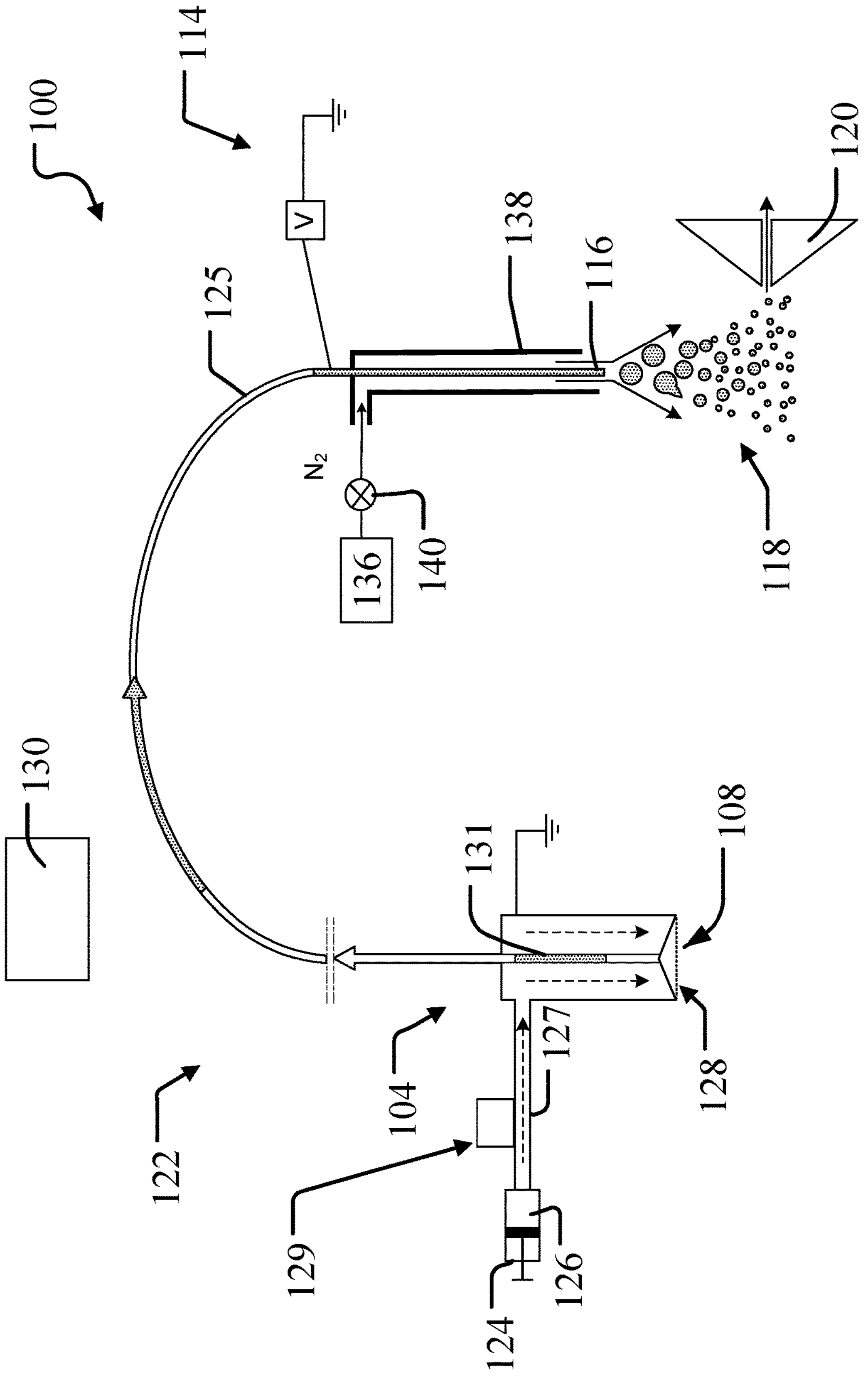
FIG. 1 is a schematic view of an example mass analysis system combining bubble generating interface (BGI) sampling interface and an ionization source.

Mass analysis systems that utilize an open port interface (OPI) are designed to typically operate in a so-called "closed flow" condition, where liquid completely fills the OPI and the removal conduit; in such cases, flow is described by the Hagan-Poiseuille (H-P) equation. One flowrate is possible for a given set of conduit conditions (e.g., aspiration or pull, physical liquid properties, conduit geometry). An OPI, however, may be operated at flowrates lower than the closed flow for a given pull; the energy balance for such flows occurs by the excess energy being used for liquid surface distortion and bubble generation. While this bubble generation may occur incidentally during operation of a mass analysis system, it is generally considered undesirable as it introduces instability into mass spectrometer signal. As such, the operating conditions of the mass analysis system (e.g., at the OPI) would be modified by a user or technician to eliminate the bubbles prior to continuing testing. The inventors, in developing the technologies described herein, have proceeded contrary to this accepted wisdom, and have used the presence of bubbles in the liquid stream to improve detectability and other performance aspects of a mass analysis system.

The inventors have discovered that with appropriate tuning and/or device design bubbles may form complete "gaps" in a liquid column confined within a conduit exiting an OPI or similar structure. In examples, this structure may also be referred to as a bubble generating interface (BGI). In this case, the bubble spans the entire diameter of the conduit, contacting the conduit along the entire inner perimeter and stretching across it such that bubble forms a complete break in the liquid. The liquid column becomes separated into segments by gas bubbles. The liquid/bubble flow is delivered to an ionization source, where ions are generated from the liquid component and then detected e.g., by a mass spectrometry device as a signal. If there were no bubbles present in the stream, the signal would be continuous, steady state signal with unchanging intensity for a given flow rate. When bubbles are present in the liquid sample, however, delivery to the ionization process is disrupted and the mass spectrometer registers a signal drop out for each bubble. Periodic dropouts may make the signal appear as pulses at a given frequency, and the bubbles may be used to modulate the signal at a desired frequency. In another example, bubbles generated in a regular pattern, but not necessarily with a uniform frequency, may also be used to condition the signal.

Further, the presence of the above-described bubbles prevents the formation of a parabolic flow (e.g. parabolic flow velocity profile across the cross section normal to the flow) of the sample within the conduit, which is caused by the friction between the moving liquid and stationary conduit walls. The degree to which this process slows down the flow depends on the distance the liquid is from the walls; hence, the liquid moves faster at the center of the conduit then along its walls. The liquid at the center moves at twice the average liquid velocity (volumetric flowrate-based speed). This speed differential across the liquid face-front leads to undesirable effects such as thermal gradient effects, lack of mixing, sample plug stretch during transport, etc. These detrimental effects are prevented by the bubble introduction. The presence of bubbles spanning the flow cross section causes creation of liquid flow cells that average the velocity within them.

The technologies described herein utilize gas introduced to a confined liquid stream to separate the stream into a plurality of discrete volumes. The gas forms bubbles within the liquid stream as it moves within a conduit from its location of introduction to a location within a system where analysis is performed. The bubble may be sized so as to span the entire diameter of the conduit, thus creating a spacer that separates two adjacent liquid plugs. The flowrate to pipe radius ratio at least partially determines the formation of such bubbles for a given liquid. Similarly, the flowrate to gas/liquid interface radius at least partially determines the formation of such bubbles for a given liquid. Other factors may include sample viscosity, surface tension, and other characteristics relative to the flow of the liquid. The bubbles can be uniformly monodispersed through the length of liquid flow (e.g., within the flow-confining conduit) or clustered, regularly clustered, or randomly distributed.

The gas that forms the bubbles may be introduced via an injection device, which can be a "T", port, or other structure for injecting gas into a liquid stream. Such an injection device may include geometry tuned to deliver the desired bubble distribution and shape. In another example, a bubble ingestion device, such as a BGI, may be utilized with the bubbles being drawn. A device similar to that of the OPI, BGI, may be utilized to allow selection of the modulating frequency, bubble size, and type of bubble clustering. The ingestion device may include a gas over liquid interface that is pressurized at pressures greater than the H-P equation flow through the conduit. Alternatively, or in combination the motive force applied to the liquid may come from a pressure reduction at the conduit exit. As an example, such pressure drop can be due to a gas expanding past the conduit exit causing Venturi effect or shock formation. The degree of over pressurization, the interface geometry, and the exit geometry may all contribute to determining the nature of bubble clustering and frequency. Selecting a uniform bubble distribution monodispersed at a given frequency allows the use of the bubbles to modulate the stream. Since the stream is delivered to an ionization device, such as an ionization nozzle, where it is turned into a detectable signal, the resultant signal will be modulated accordingly.

This would enable modulation at a "lock in" frequency for noise reduction, signal isolation, and signal identification. In general, noise reduction may be achieved by isolating the signal to only the component appearing at the carrier (modulated) frequency. Steady state sample delivery is disrupted by bubbles at a uniform frequency, the signal is generated as pulses at a uniform frequency. Only the signal arriving at the "carrier" frequency is then monitored to allow rejection of "ambient" noise signal that is not arriving at the carrier frequency (signal rejection application).

Signal isolation may be used to introduce simultaneously a signal from multiple generating devices, such as multiple ionization sources or multiple BGI devices into a single ionization source, into a single detector, and differentiating the origin of each signal stream based on its individual carrier frequency. In cases where more than one ionization source is simultaneously monitored by a single mass spectrometer, or more than one sample stream is detected by a single mass spectrometer, the origin of the signal can be linked to a given sample stream if each stream is modulated at a different frequency (e.g., in a so-called multiplexing application). This approach would allow improvements in high throughput applications.

Signal identification may be achieved when a single detector is being used to simultaneously collect the signal generated from different devices, such as a system operating simultaneously with electrospray ionization (ESI) mode and atmospheric-pressure chemical ionization (APCI) mode. As an example, APCI can ionize one channel while ESI ionizes another. In this example, each ionization technique offers access to a different class of chemicals. Bubble modulation can be used to determine what ionization process offers more efficient way of generating a signal. Until now, this approach would maximize the "visibility" of an unknown sample, but the preferred means of ionization would be unknown. If each of the two ionization modes are modulated at a different frequency, locking in on that frequency would identify the ionization mode allowing the determination of a preferred ionization technique for a given sample or more complete detection coverage of compounds present in an unknown sample.

FIG. 1 is a schematic view of an example mass analysis system 100 combining an bubble generating interface (BGI) sampling interface 104 and an ionization source 114 such as an ESI source. The system 100 may be a mass analysis instrument such as a mass spectrometry device that is for ionizing and mass analyzing analytes received at the sampling BGI 104. As shown in FIG. 1, the example system 100 generally includes the sampling BGI 104 in liquid communication with the ESI source 114 for discharging a liquid containing one or more sample analytes (e.g., via electrospray electrode 116) into an ionization chamber 118, and a mass analyzer detector (depicted generally at 120) in communication with the ionization chamber 118 for downstream processing and/or detection of ions generated by the ionization source 114. As a non-limiting example, the ionization source 114 may be one or more of an ESI source and/or combination of an APCI source, APPI, DART. With regard to the ESI source, nebulizer gas assisted ESI is depicted, due to the configuration of the nebulizer probe 138 and electrospray electrode 116 of the ESI source 114, samples ejected therefrom are microdroplets that desolvate to release sample as ions. A liquid handling system 122 (e.g., including one or more pumps 124) provides for the flow of liquid from a reservoir 126 to the sampling BGI 104. Aspiration pressure generated at the ESI source 114, caused by the expanding nebulizer gas, draws the sample through one or more transfer conduits 125 from the sampling BGI 104 to the ESI source 114. The reservoir 126 (e.g., containing a liquid, desorption solvent, a sample to be tested, etc.) can be fluidically coupled to the sampling BGI 104 via a supply conduit 127 through which the liquid can be delivered at a selected volumetric rate by the pump 124 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example.

The sample may be introduced into the system 100 through one or more sample sources. In one example, a sample port 129 may be used to introduce the sample at a steady state condition to the supply conduit 127. In an alternative example, the sample may be contained within the reservoir 126 and/or introduced into the port 108 of the BGI 104. Sample could also be introduced in gas phase over the meniscus 128 inside the port 108. As discussed in detail below, the flow of liquid into the sampling BGI 104 is via the supply conduit 127, which results in a liquid boundary 128 being formed at a inlet port 108 of the BGI 104. The introduced sample is then drawn first into a sample removal conduit 131 within the BGI 104 for aspiration towards the ESI source 114.

Alternative systems based on the above system 100 are also contemplated. For example, multiple BGIs may be utilized in conjunction with multiple ionization devices, with each BGI connected to a dedicated sample source. The multiple ionization devices may be utilized in conjunction with a single mass analysis detector. In another example, a single BGI and sample source may be connected to multiple ionization sources. In another example, multiple BGIs and sample sources may be connected to a one ionization source. In the various multiplexing cases where a single mass analysis detector is used, frequency-based signal deconvolution is used to isolate the signal and identify the source of a given signal component. In this case the signal trace extending in time is considered for the deconvolution. As a non-limiting example this may take a form of frequency deconvolution such as Fourier transform or Fast Fourier Transform (FFT). A "lock-in" type detectors have been used in the past for a frequency-based detection. A simpler time domain-based approach may be used where the different BGIs start at time offset with respect to each other. The time domain approach may be generalized as starting and operating each BGI such as to allow unique time position for each sample stream.

An acoustic droplet ejection (ADE) device can also be used to introduce sample into the transport stream via the port 108. A controller 130 can be operatively coupled to the ADE and can be configured to operate any aspect of the system 100. Controller 130 can be, but is not limited to, a microcontroller, a computer, a microprocessor, or any device capable of sending and receiving control signals and data. Wired or wireless connections between the controller 130 and the various elements of the system 100 (e.g., the pump 124, ESI 114, mass analyzer detector 120, etc.) are not depicted but would be apparent to a person of skill in the art.

As shown in FIG. 1, the ESI source 114 can include a source 136 of pressurized gas (e.g. nitrogen, air, or a noble gas) that supplies a high velocity nebulizing gas flow to the nebulizer probe 138 that surrounds the outlet end of the electrospray electrode 116. As depicted, the electrospray electrode 116 protrudes from a distal end of the nebulizer probe 138. The pressured gas interacts with the liquid discharged from the electrospray electrode 116 to enhance the formation of the sample plume and the ion release within the plume for sampling by mass analyzer detector 120, e.g., via the interaction of the high speed nebulizing flow and jet of liquid sample (e.g., analyte-solvent dilution). The liquid discharged may include discrete volumes of liquid samples LS separated by one or more bubbles generated at the BGI 104, as described elsewhere herein. The nebulizer gas can be supplied at a variety of flow rates, for example, in a range from about 0.1 L/min to about 20 L/min, which can also be controlled under the influence of controller 130 (e.g., via opening and/or closing valve 140). In other examples, an APCI source may be utilized in addition to or instead of the ESI source. Such devices are well-known in the art. The nebulizer gas expanding past the electrospray electrode 116 (an extension of the transfer conduit 125) exit creates an aspiration pressure within the sample removal conduit 131 through pressure reduction caused by Venturi effect or shock formation. The Venturi effect is physically different from the "shock formation". Venturi creates a reduced pressure for moderate to low pressure differentials encountered in the nebulizer gas expansion, it is an isentropic flow (process is reversible and entropy remains constant). When the pressure differential is higher, supersonic expansion may occur that leads to a formation of oblique and normal shocks that govern the flow and the aspiration pressure (force). The "shock" flow is not isentropic. For under expanded nozzles, (such as the nebulizer nozzle), supersonic expansion flow occurs for ratio of pressures (gas drive pressure/ambient pressure into which drive gas is expanding) of about 1.89. At and above this ratio shock structure forms in the expanding gas. This leads to a periodic variation in the aspiration pressure as distance increases away from the nozzle. For a drive pressure/ambient pressure ratio of 4 and greater Mach disk forms, it is normal to the gas flow and terminates the conical shock structure. Aspiration pressure pull is maximized at a distance below the nozzle, just before the Mach disk.

It will be appreciated that the flow rate of the nebulizer gas can be adjusted (e.g., under the influence of controller 130) such that the flow rate of liquid within the sampling OPI 104 can be adjusted based, for example, on suction/aspiration force generated by the interaction of the nebulizer gas and the analyte-solvent dilution as it is being discharged from the electrospray electrode 116 (e.g., due to the Venturi effect or shock formation). The ionization chamber 118 can be maintained at atmospheric pressure, though in some examples, the ionization chamber 118 can be evacuated to a pressure lower than atmospheric pressure.

It will also be appreciated by a person skilled in the art and in light of the teachings herein that the mass analyzer detector 120 can have a variety of configurations. Generally, the mass analyzer detector 120 is configured to process (e.g., filter, sort, dissociate, detect, etc.) sample ions generated by the ESI source 114. By way of non-limiting example, the mass analyzer detector 120 can be a triple quadrupole mass spectrometer, or any other mass analyzer known in the art and modified in accordance with the teachings herein. Other non-limiting, exemplary mass spectrometer systems that can be modified in accordance with various aspects of the systems, devices, and methods disclosed herein can be found, for example, in an article entitled "Product ion scanning using a Q-q-Q linear ion trap (Q TRAP) mass spectrometer," authored by James W. Hager and J. C. Yves Le Blanc and published in Rapid Communications in Mass Spectrometry (2003; 17: 1056-1064); and U.S. Pat. No. 7,923,681, entitled "Collision Cell for Mass Spectrometer," the disclosures of which are hereby incorporated by reference herein in their entireties.

Other configurations, including but not limited to those described herein and others known to those skilled in the art, can also be utilized in conjunction with the systems, devices, and methods disclosed herein. For instance, other suitable mass spectrometers include single quadrupole, triple quadrupole, ToF, trap, and hybrid analyzers. It will further be appreciated that any number of additional elements can be included in the system 100 including, for example, an ion mobility spectrometer (e.g., a differential mobility spectrometer) that is disposed between the ionization chamber 118 and the mass analyzer detector 120 and is configured to separate ions based on their mobility difference between in high-field and low-field). Additionally, it will be appreciated that the mass analyzer detector 120 can comprise a detector that can detect the ions that pass through the analyzer detector 120 and can, for example, supply a signal indicative of the number of ions per second that are detected.

Figure 2B:
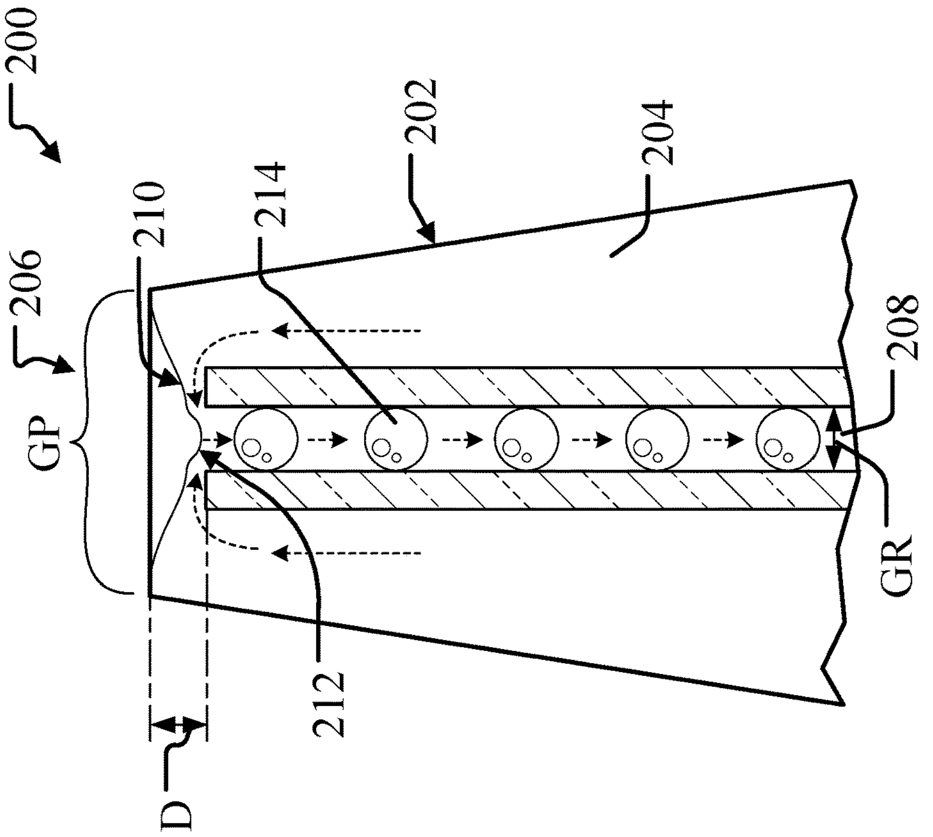
FIGS. 2A-2C depict partial cross-sectional views of an BGI displaying a first bubble flow condition.
Figure 2A:
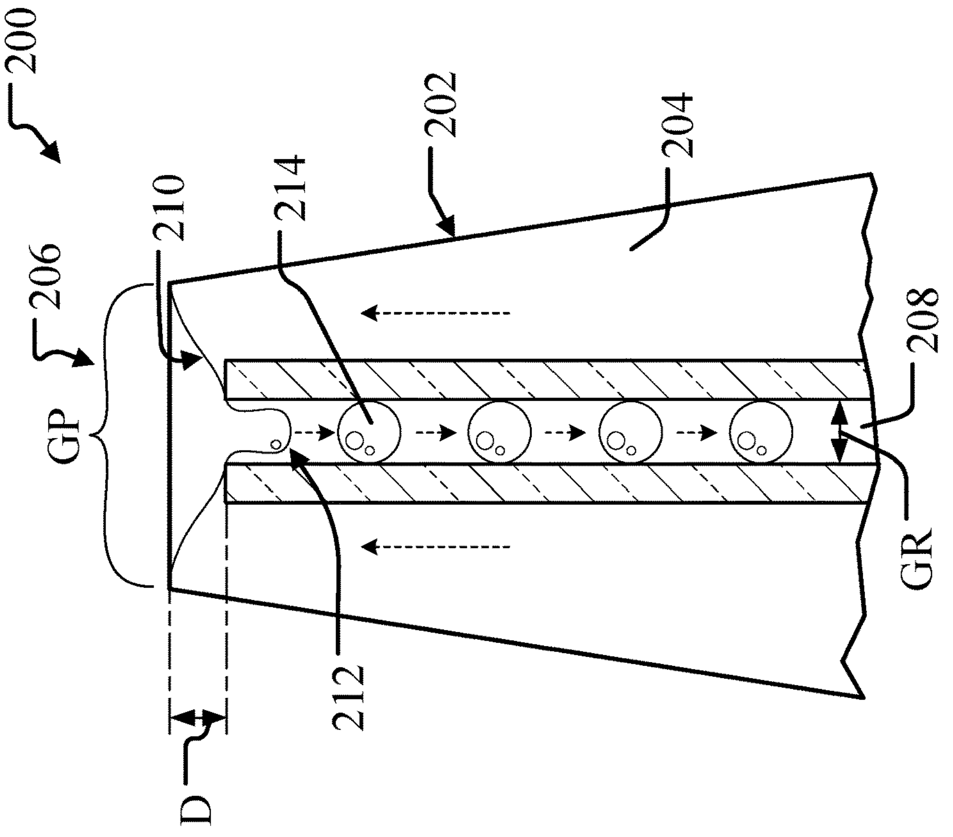
Figure 2C:
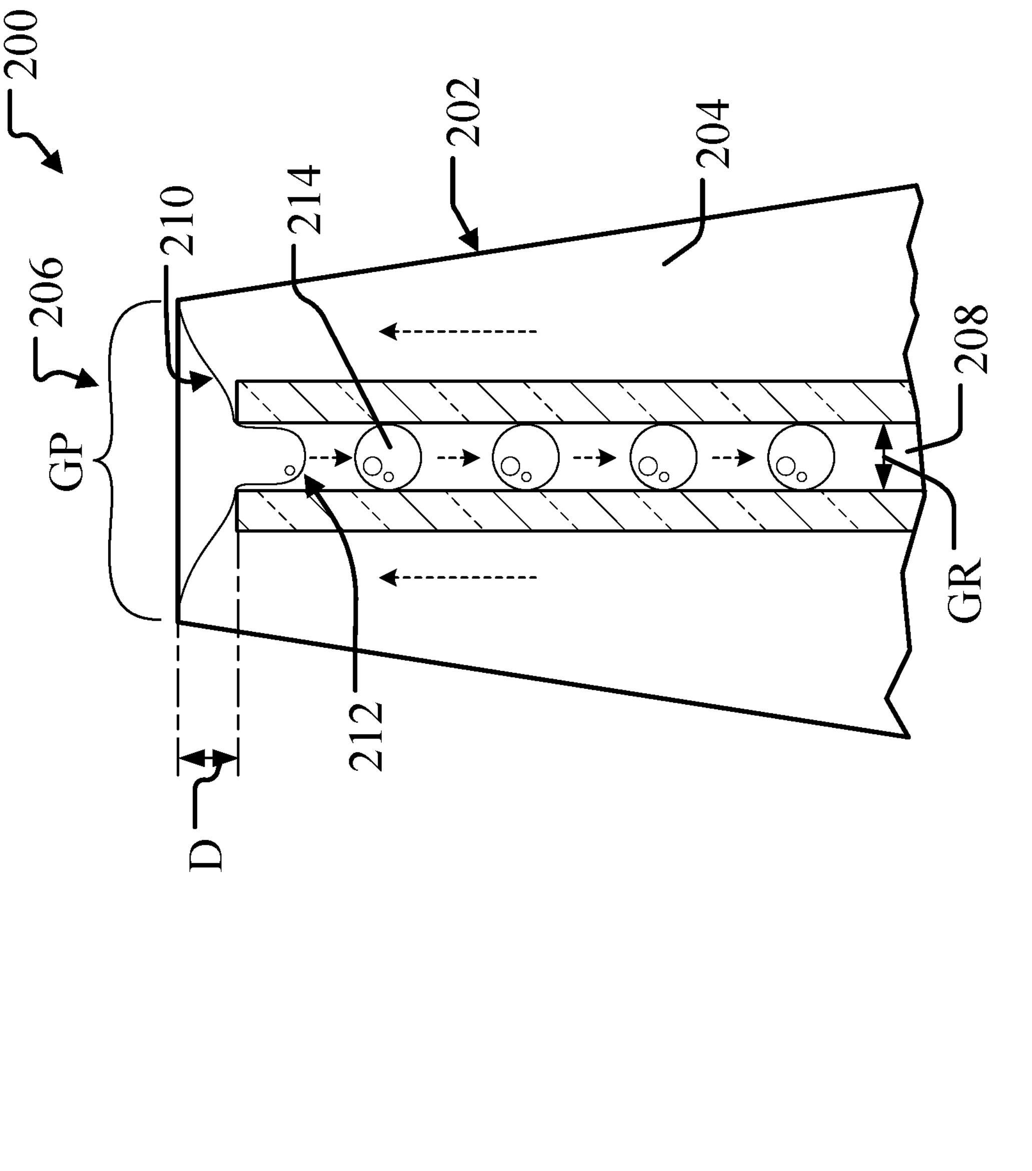

FIGS. 2A-2C depict partial cross-sectional views of an BGI 200 displaying a first bubble flow condition. The BGI 200 includes an outer wall 202 that defines a supply conduit 204 therein and a port inlet 206. A removal conduit 208 is disposed within the OPI 200, and may be separated from the port inlet 206 by an adjustable distance D. Further, the port inlet 206 may be adjustable in cross-sectional geometry GP; the removal conduit 208 may also be adjustable in cross-sectional geometry GR. As used herein, the term "cross-sectional geometry" refers to either or both of the cross-sectional area and the cross-sectional shape. In other words, either or both of the port inlet 206 and removal conduit 208 may be configured to be adjustable in area and/or shape (e.g. oval, round, squoval, etc.). A liquid, which may be a sample to be tested, is delivered to the BGI 200 via a supply conduit (not shown, element 127 in FIG. 1) and aspirated from the BGI 200 via the removal conduit 208. When in the BGI 200, the liquid forms a meniscus 210 proximate the port inlet 206, which deflects downward towards and into the removal conduit 208. In this first bubble flow condition, a pull is applied to the liquid (e.g., the Venturi pull or aspiration pressure drop generated at the ESI nozzle downstream) and the liquid inflow rate is reduced to about 80% to about 40% of the closed flow condition (as represented by the H-P flowrate). In this condition, there is excess energy that is not used to move the liquid and needs to be dissipated by the system. Hence, the meniscus 210 is stretched into the removal conduit 208; a tip 212 thereof remains in the removal conduit 208 during this first bubble flow condition. This results in a uniformly spaced train of small bubbles 214 being generated which, in examples, may be about 3 nL each. At the mass analysis detector, this results in a periodic pulsing of the signal at a predetermined or established frequency (e.g., about 1 kHz). The frequency at the first bubble flow condition may be adjusted in one or more ways. These include adjustment of the liquid inflow flow rate, aspiration pressure, separation distance D, cross-sectional geometry GP and/or GR, and liquid viscosity, as described in more detail below. The cyclic nature of the bubble generation is illustrated by the sequence of the FIG. 2, FIG. 2A to FIG. 2B to FIG. 2C to FIG. 2A.

Figure 3:
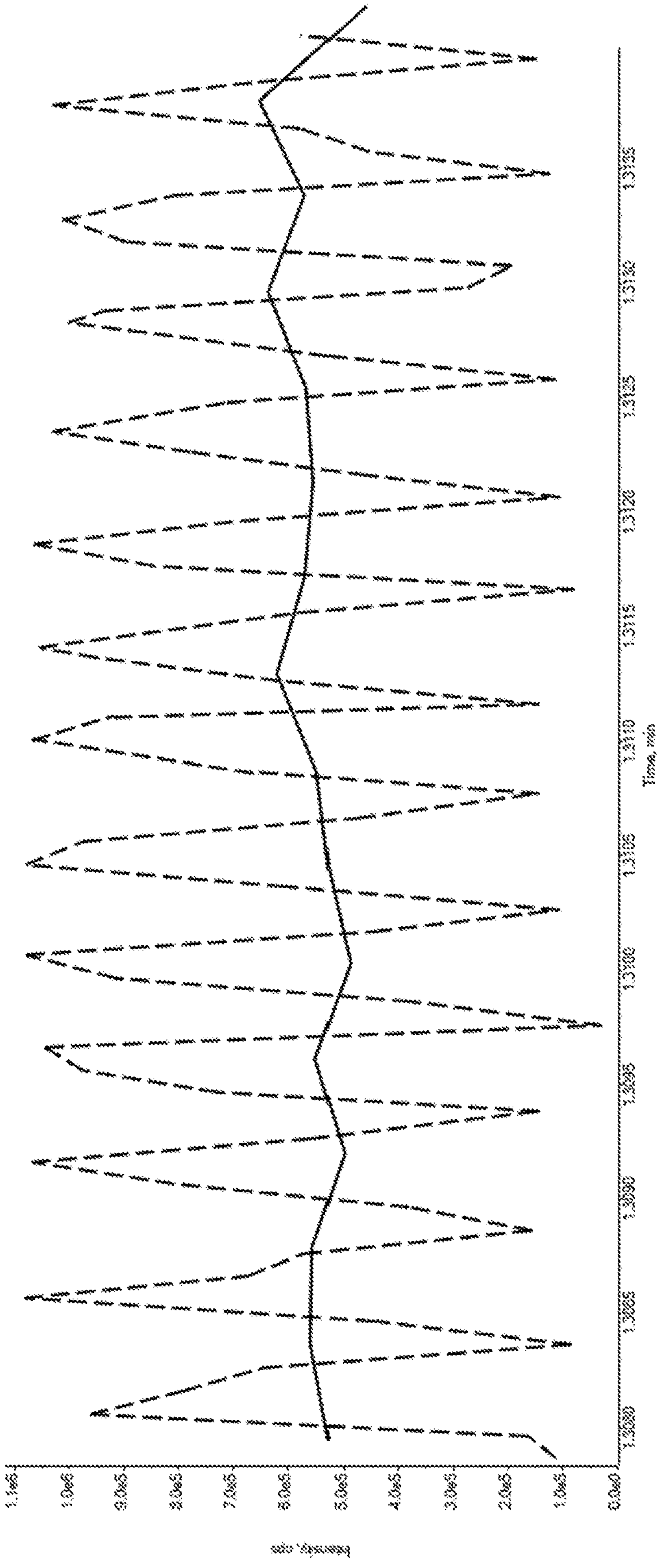
FIG. 3 depicts a plot that depicts a phthalate multiple reaction monitoring (MRM) of a background ion in a liquid.

FIG. 3 depicts a plot of a phthalate multiple reaction monitoring (MRM) of a background ion in a liquid. In this plot, an BGI is being operated in the first bubble flow condition depicted and described in FIGS. 2A-2C. In this case, the liquid is a methanol (MeOH) transport liquid and detection is using 1 msec dwell. The dashed trace is at a preferred BGI flow rate and displays regular dropouts at a single point separation that correlate with the nano-bubbles generated within the liquid stream. In the depicted configuration, the dropouts are detected by about a 2× increase in the standard deviation of the signal over that of the closed flow, depicted in the solid trace. In this example, the size of the bubbles and their frequency approaches that of nebulizer assisted ESI inherent noise, due in part to the liquid break up at the nebulizer nozzle.

With an BGI structurally designed to be adjustable in one or more aspects (e.g., with regard to cross-sectional geometry G, separation distance D), and with appropriate flow characteristics (e.g., with regard to liquid inflow, aspiration pressure, liquid viscosity, etc.), the bubble generation frequency may be set to a range desired for a particular application. The structure of the BGI and the selected flow characteristics are related to the frequency of the bubbles generated (e.g., introduced) into a removal conduit. In examples, the internal diameter of the removal conduit will likely determine the bubble frequency in the "critical flow mode" when the meniscus is pulled into the conduit. As the meniscus gets stretched into the removal conduit by the Venturi over-pumping, the size (e.g., diameter, area, shape) of the removal conduit may determine the amount of stretch of the meniscus, and therefore the energy stored in the surface tension. When that energy reaches a critical limit (e.g., characterized in part by how much that meniscus stretches) it breaks, thus forming the bubble. The liquid viscosity and surface tension are also relevant characteristics that will interact with the removal conduit diameter to determine the appropriate cross-sectional geometry for a particular liquid.

A number of experiments have been performed to determine which of the structural and flow factors described above effect bubble generation. It has been determined that for certain bubble flow conditions, some factors effect bubble generation more than others, though all factors may have some effect on bubble generation. For example, FIGS. 2A-2C and 3 depict a first bubble flow condition, e.g., at about 80% to about 40% of the closed flow condition. At this flow condition, some component of the bubble generation may be due to the removal conduit geometry itself. In a second bubble flow condition just short of balanced flow (about 10% below H-P flow), removal conduit diameter and separation distance between the port inlet and removal conduit appear to be relevant to the bubble frequency and bubble size (in addition to the liquid properties and flow rate) as is the port (406 in FIG. 4) size and geometry. Such a case is depicted and described in FIGS. 4A-4C and 5, below. In such a case, the bubble frequency is about 1000 times slower than the bubble frequency at the first bubble flow condition described in the context of FIGS. 2A-2C and 3. In examples, it has been determined that the bubbles formed inside the BGI may be about 10 times to 100 times larger than those generated in the first bubble flow condition. In a third bubble flow condition, the flow rate is much farther from the balanced flow condition (about 10% to about 20% of the H-P flow). In this condition, the removal conduit internal diameter and flow rate combination produce small liquid plugs separated by larger bubbles, which is a converse of the first bubble flow condition, where small bubbles are separated by large plugs of liquid. The third bubble flow condition is depicted and described in the context of FIGS. 6A-6D and 7.

Figure 4A:
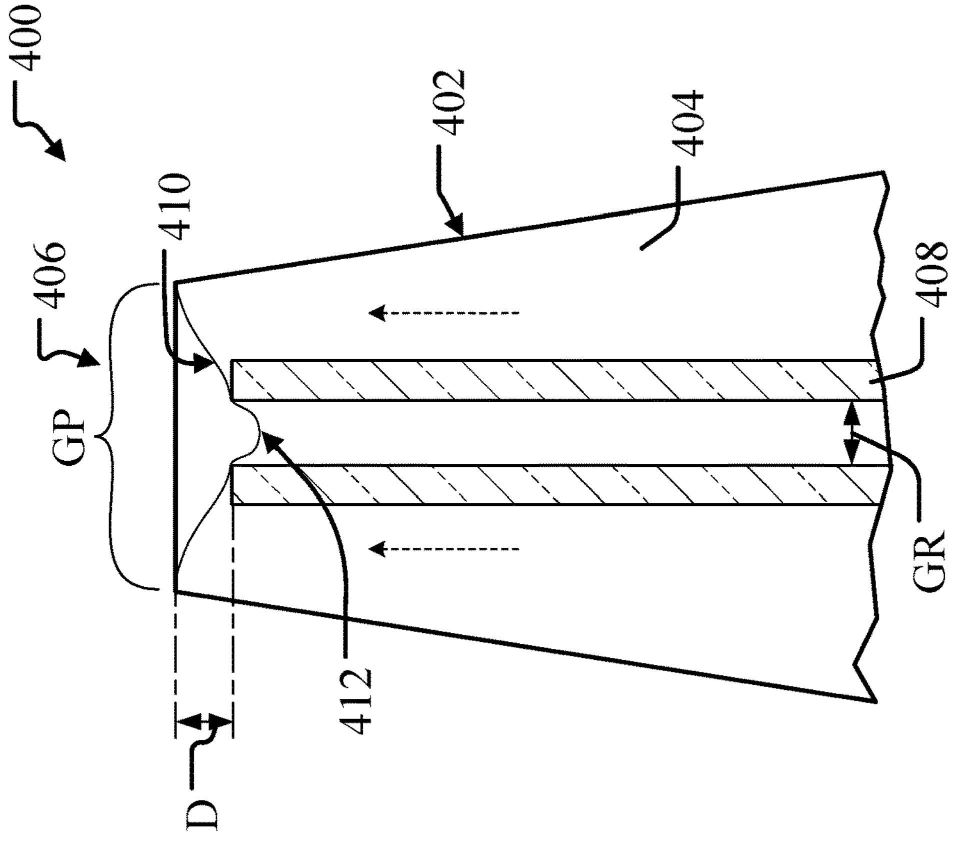
FIGS. 4A-4C depict partial cross-sectional views of an BGI displaying a second bubble flow condition.
Figure 4B:
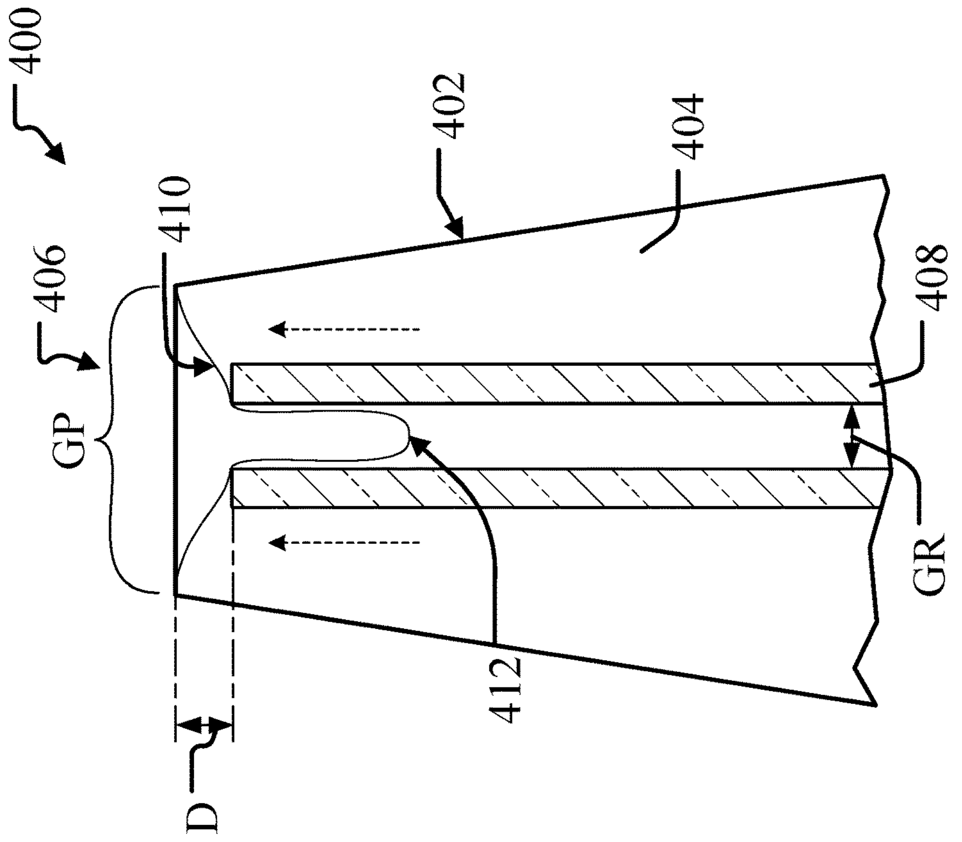
Figure 4C:
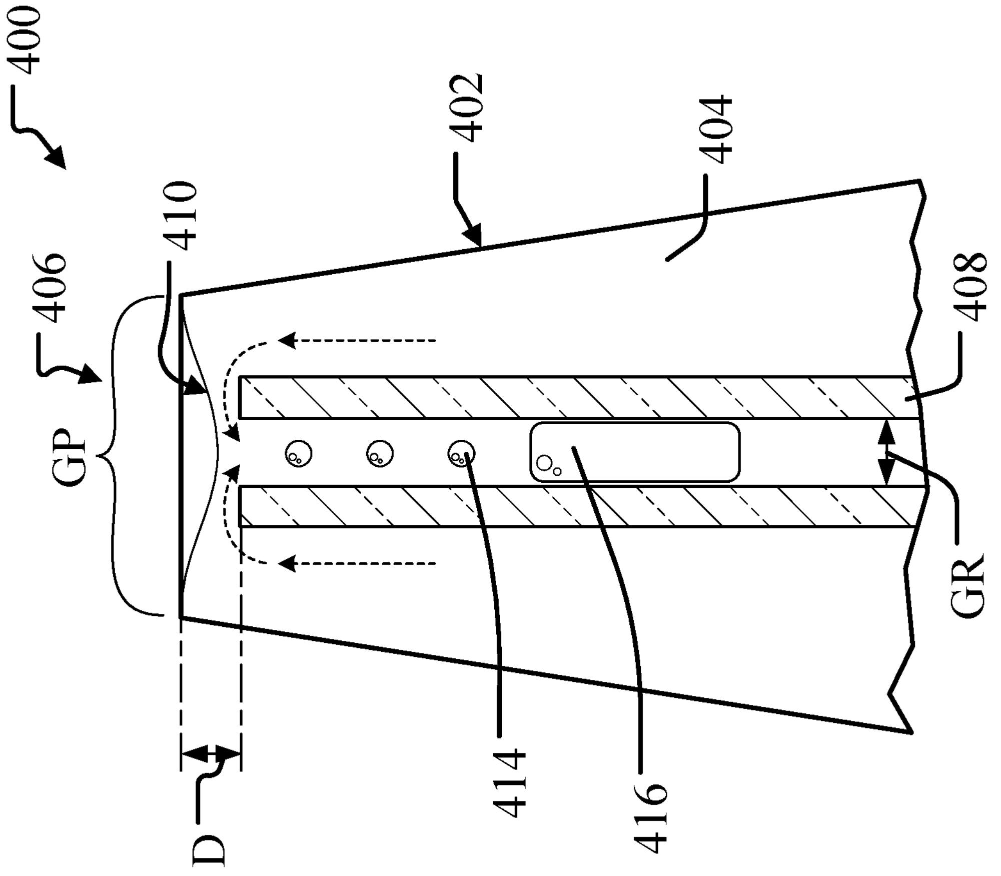

FIGS. 4A-4C depict partial cross-sectional views of an BGI 400 displaying a second bubble flow condition. The BGI 400 includes an outer wall 402 that defines a supply conduit 404 therein and a port inlet 406. A removal conduit 408 is disposed within the BGI 400, and may be separated from the port inlet 406 by an adjustable distance D. Further, the removal conduit 408 and port inlet 406 may be adjustable in cross-sectional geometry GR or GP, respectively, as defined elsewhere herein). A liquid, which may include or be a sample, is delivered to the OPI 400 via a supply conduit (not shown, element 127 in FIG. 1) and aspirated from the OPI 400 via the removal conduit 408. When in the OPI 400, the liquid forms a meniscus 410 proximate the port inlet 406, which deflects downward towards the removal conduit 408. In this second bubble flow condition, a pull is applied to the liquid (e.g., the Venturi pull or aspiration pressure drop generated at the ESI nozzle downstream) and the liquid inflow rate is reduced to about 90% of the closed flow condition (as represented by the H-P flowrate). The meniscus 410 stretch occurs within the larger diameter of the port inlet 406, the stretch is dynamic and keeps extending until it reaches the removal conduit 408, as shown by 412, where it forms a large bubble 416 and possibly a train of smaller satellite bubbles 414. Depending on the presence of the satellite bubbles, this may generate a periodic signal oscillation at a uniform low frequency about 1 Hz or a regular pattern of bubbles and hence signal dropouts. The excess energy provided by the nebulizer nozzle is dissipated by bubble formation within the port inlet 406 itself. In examples, the port inlet may have a diameter of about 1 mm.

FIG. 4C shows the single curvature meniscus 410 that is of a nearly balanced flow, in FIG. 4A the excess energy stretches the tip 412 of the meniscus 410 towards the removal conduit 408. As noted elsewhere herein, the nebulizer nozzle (not shown) provides motive energy to the liquid flow; during closed flow this energy is balanced by the volumetric inflow of the sample. Since the system is operating at just below the closed flow (again, at about 90% thereof), the nebulizer nozzle is providing energy to the system that is in the excess of what is needed to move the current flowrate under closed flow condition, in which no bubbles would be generated. FIG. 4B depicts that the excess energy within the liquid has built up to a point that the tip 412 of the meniscus 414 extends into the removal conduit 408. This process slows the flow of liquid out of the removal conduit 408 and returns the meniscus 410 to a position outside of the removal conduit 408 proximate the inlet port 406, with a larger bubble 416 having formed inside the removal conduit 408, as depicted in FIG. 4C, where the system returns to the balanced flow condition. The cycle repeats, giving rise to an observed fluctuation inside the port inlet 406. In an example, the cycle frequency is in about 0.1 Hz to about 3.0 Hz. Other frequencies are contemplated, e.g., about 1 Hz to about 10 kHz, or about 10 Hz to about 2 kHz.

Figure 5:
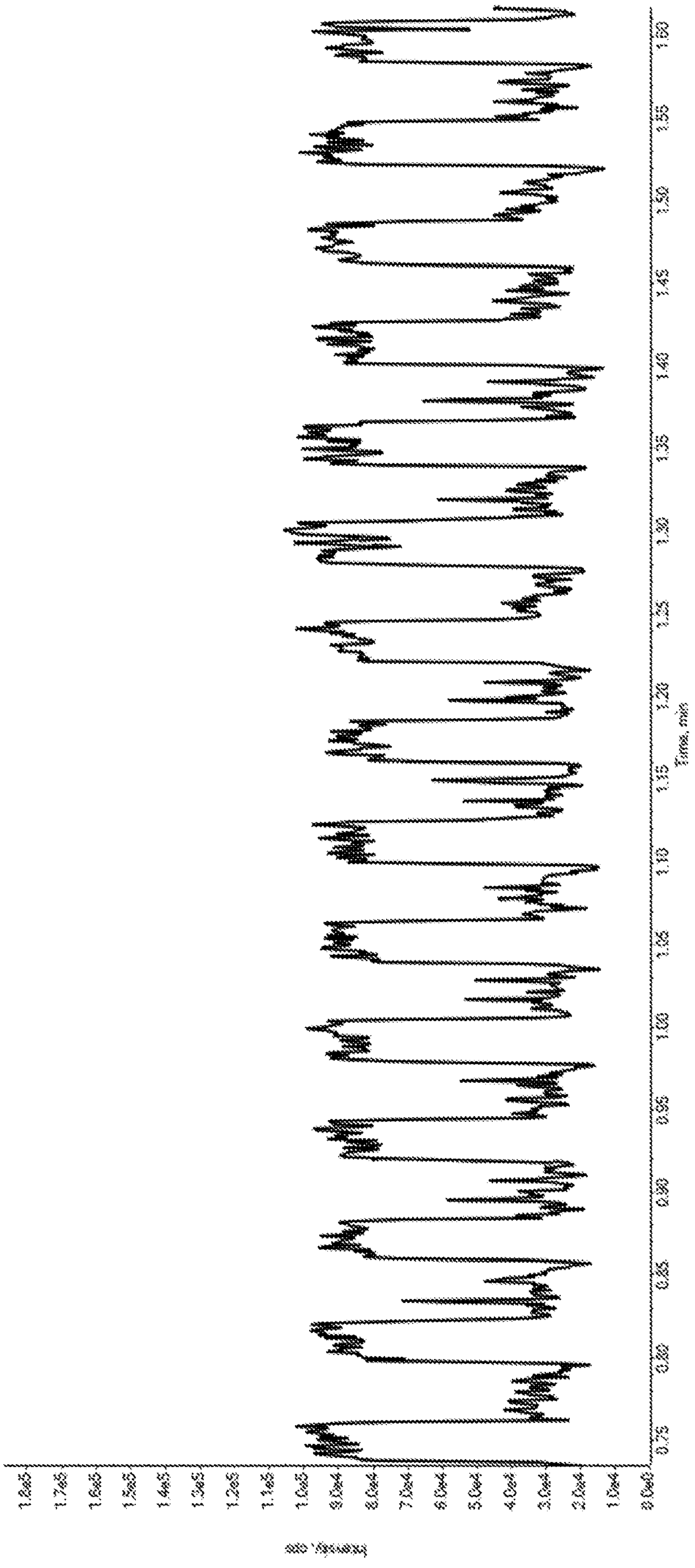
FIG. 5 depicts a plot of MRM baseline signal modulation caused by the larger bubbles generated in FIGS. 4A-4C.

FIG. 5 depicts a plot of MRM signal modulation caused by the larger bubbles generated during this process. The bubbles cause the signal to drop to the baseline, while the liquid segments of the flow generate a signal above the baseline. The results in almost a square wave of 50% duty cycle (signal is "on" for half the cycle) with 0.3 Hz frequency. The well-defined and predictable presence of the signal can be used to isolate the signal originating within that BGI.

Figure 6B:
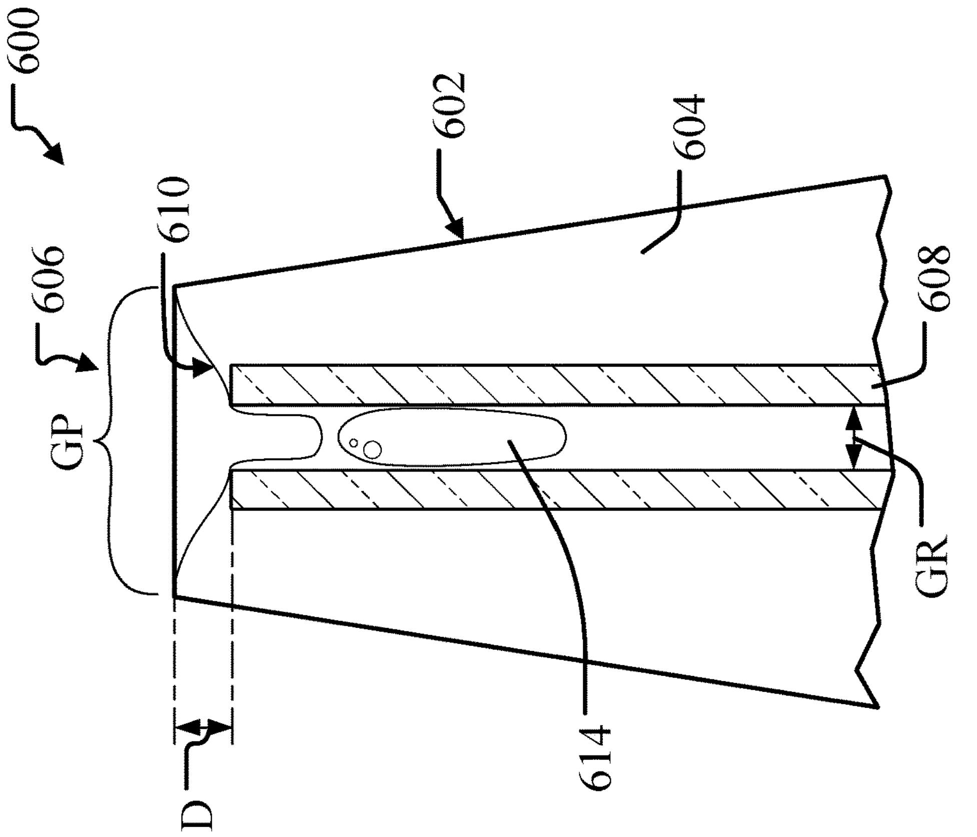
FIGS. 6A-6D depict partial cross-sectional views of an BGI displaying a third bubble flow condition.
Figure 6A:
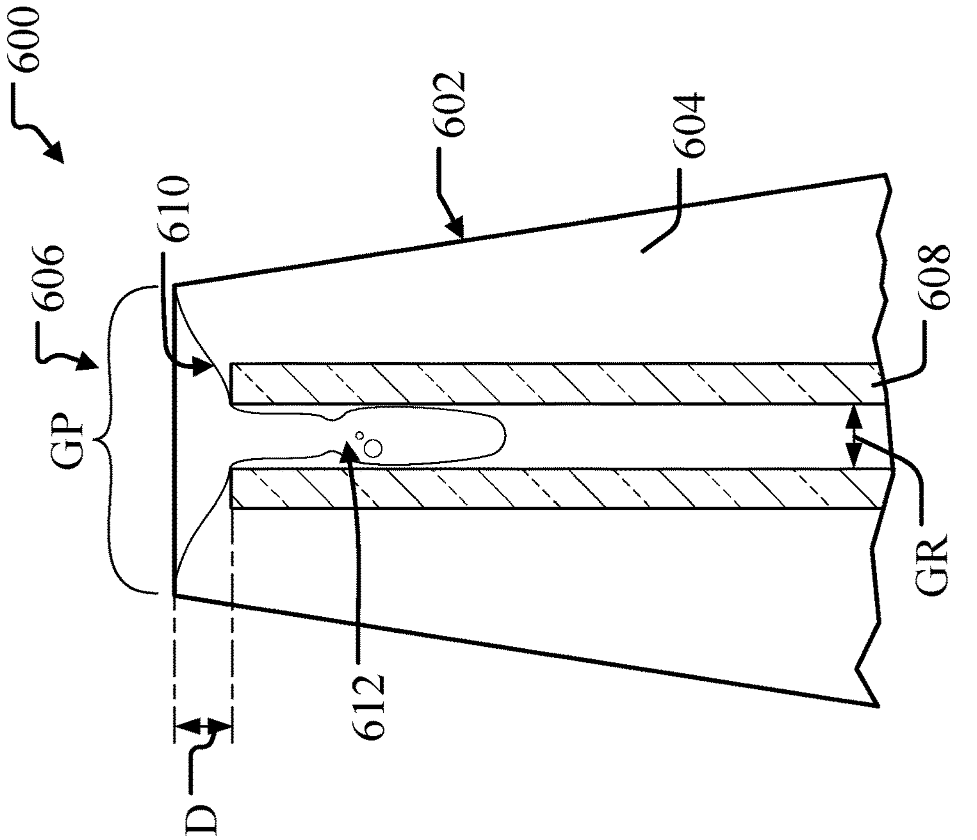
Figure 6D:
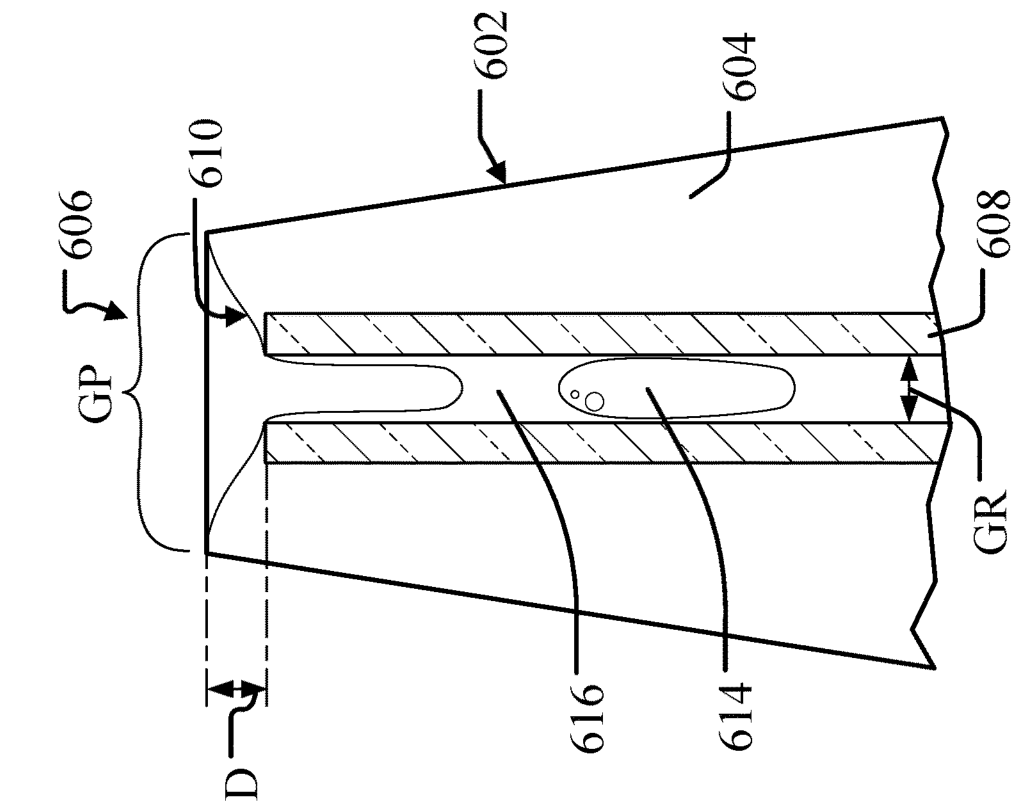
Figure 6C:
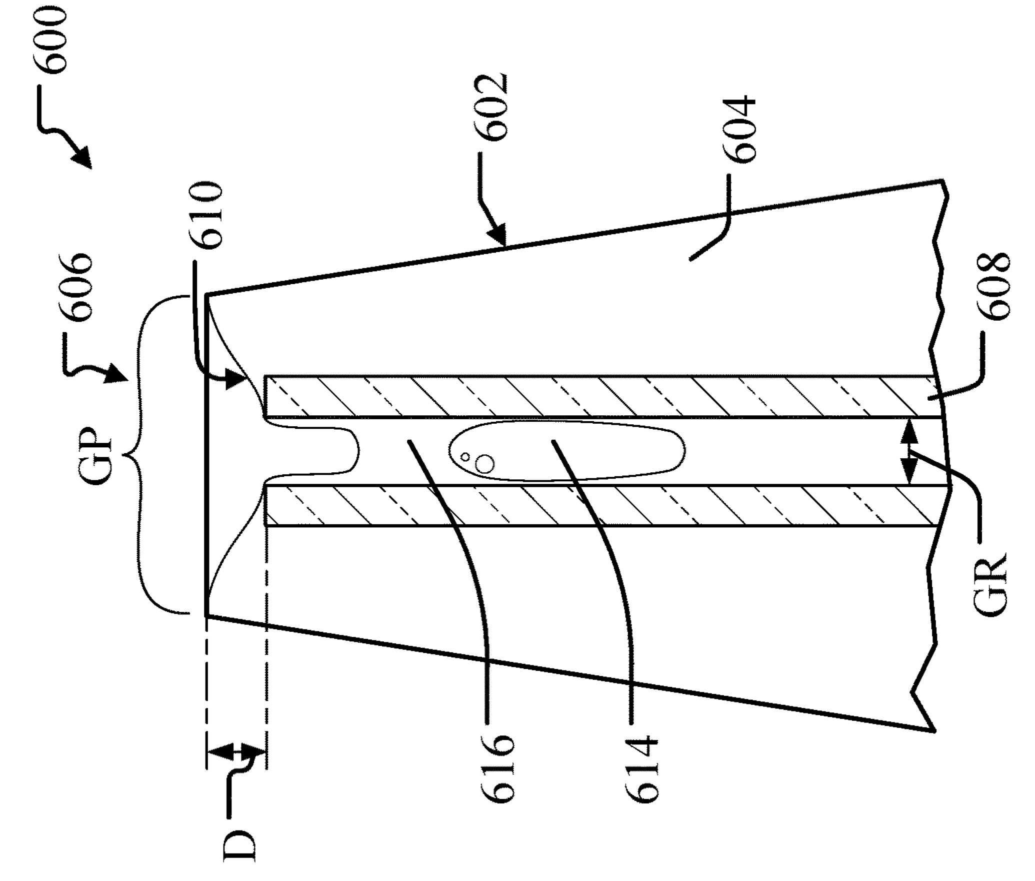

FIGS. 6A-6D depict partial cross-sectional views of an BGI 600 displaying a third bubble flow condition. The BGI 600 includes an outer wall 602 that defines a supply conduit 604 therein and a port inlet 606. A removal conduit 608 is disposed within the BGI 600, and may be separated from the port inlet 606 by an adjustable distance D. Further, the removal conduit 608 and part of inlet 606 may be adjustable in cross-sectional geometry GR or GP, respectively, as defined elsewhere herein). A liquid, which may be a sample, is delivered to the BGI 600 via a supply conduit (not shown, element 127 in FIG. 1) and aspirated from the BGI 600 via the removal conduit 608. When in the BGI 600, the liquid forms a meniscus 610 proximate the port inlet 606, which deflects downward towards the removal conduit 608. In this third bubble flow condition, a pull is applied to the liquid (e.g., the Venturi pull or aspiration pressure drop generated at the ESI nozzle downstream) and the liquid inflow rate is reduced to about 20% of the closed flow condition (as represented by the H-P flowrate). As can be seen, small liquid plugs are separated by large bubbles. This third bubble flow mode is associated with a severely over-pumped port, where the removal conduit 608 is filled mostly with air bubbles 614 that are separated by small liquid plugs 616. FIGS. 6C and 6D depict this small liquid plug 616 that has formed between two large bubbles 614. The small liquid plugs 616 are MRM detectable as periodic signal and can be analyzed based on its frequency.

Figure 7:
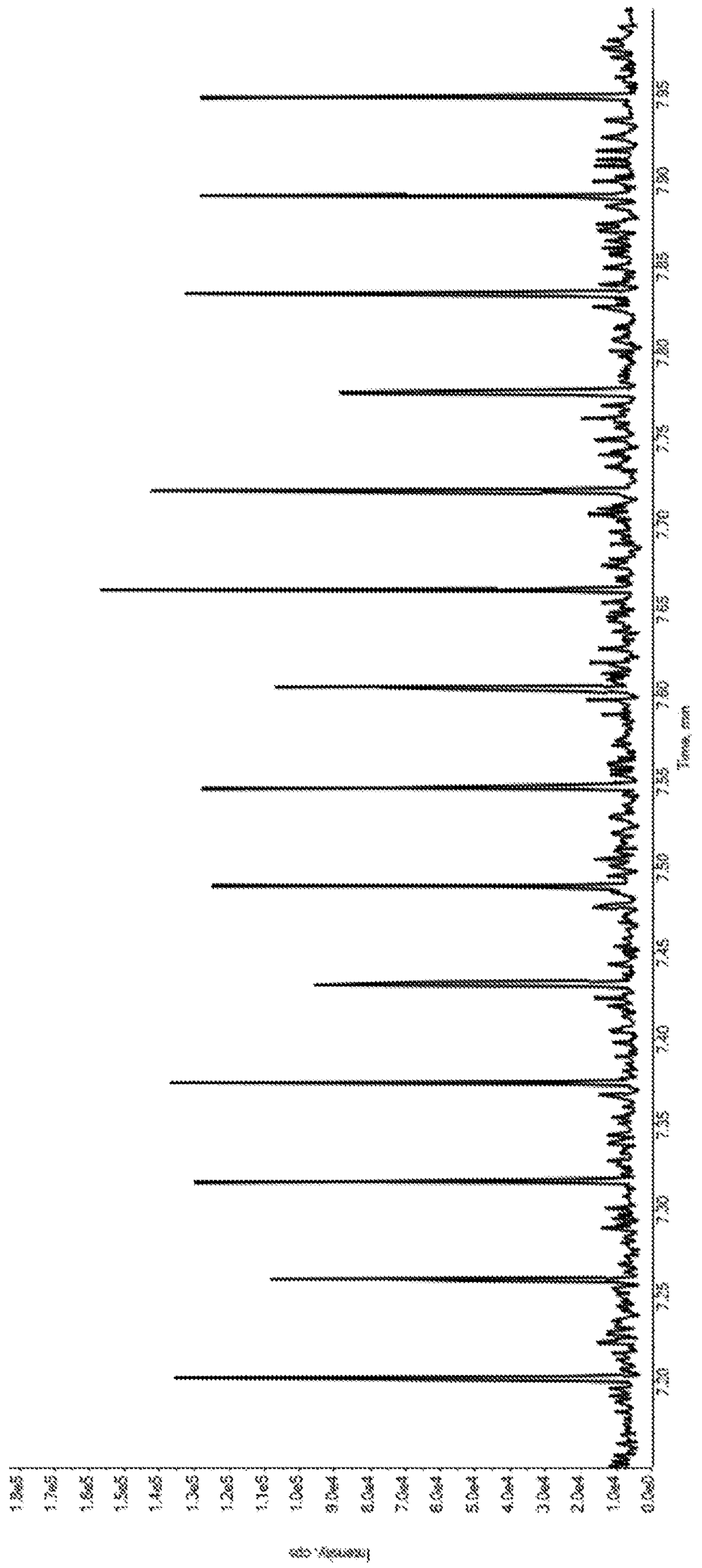
FIG. 7 depicts a plot of a signal generated in the third bubble flow condition.

FIG. 7 depicts a plot of a periodic signal generated in the third bubble flow condition. The signal is only present when the liquid is exiting the ESI electrode, in this case the signal represents only a small portion of the cycle, about 3%. Pulse width is about 100 msec and frequency is 0.29 Hz. This contrasts with the previous flow mode and illustrates how the BGI operation and design can be used not only to alter frequency of the signal appearance but also its duty cycle.

The operational flow of an BGI may be changed during initial system setup during testing of samples. The changes may be between the various first, second, or third bubble flow modes. Alternatively, operational flow may be changed from a first bubble generation frequency to a second bubble generation frequency within a single flow mode. The frequency and pattern of the bubbles and hence the signal dropouts (e.g., modulation) may be altered by a suitable design of the BGI. Reducing the diameter of the liquid surface air interface within the port inlet reduces the bubbles size and increases the frequency at which they are generated. Hence altering the port inlet diameter and/or the removal conduit diameter may be used to tune the system to produce desirable state and frequency of the bubbles. Similarly, the distance between the port inlet and removal conduit may also be used to tune the bubble generation process. Each of these geometrical parameters can be changed by itself or in combination to achieve the desired effect. Further physical/chemical properties of the BGI walls in contact with the liquid could also be used to alter the bubble generation. Physical properties such as “wetting” (e.g., surface energy of the wall interacting with the liquid, where high surface energy indicates strong molecular forces between a substrate and the liquid and hence greater adherence, in contrast high liquid surface tension tends to diminish the liquid surface interaction) or surface texture, pattern, roughness could also be used to manage the bubbles.

Figure 8A:
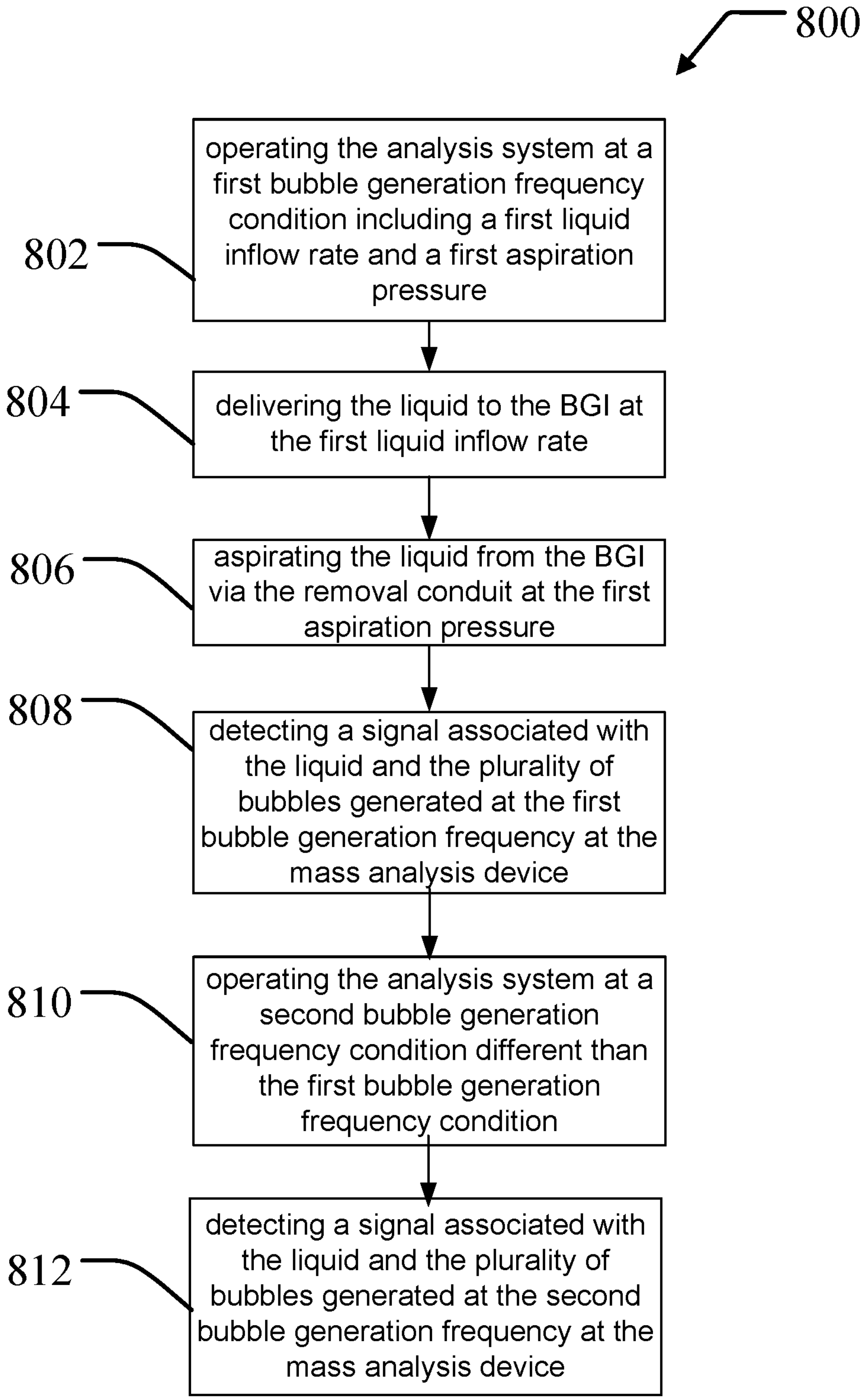
FIGS. 8A and 8B depict methods of analyzing a liquid with a mass analysis system.
Figure 8B:
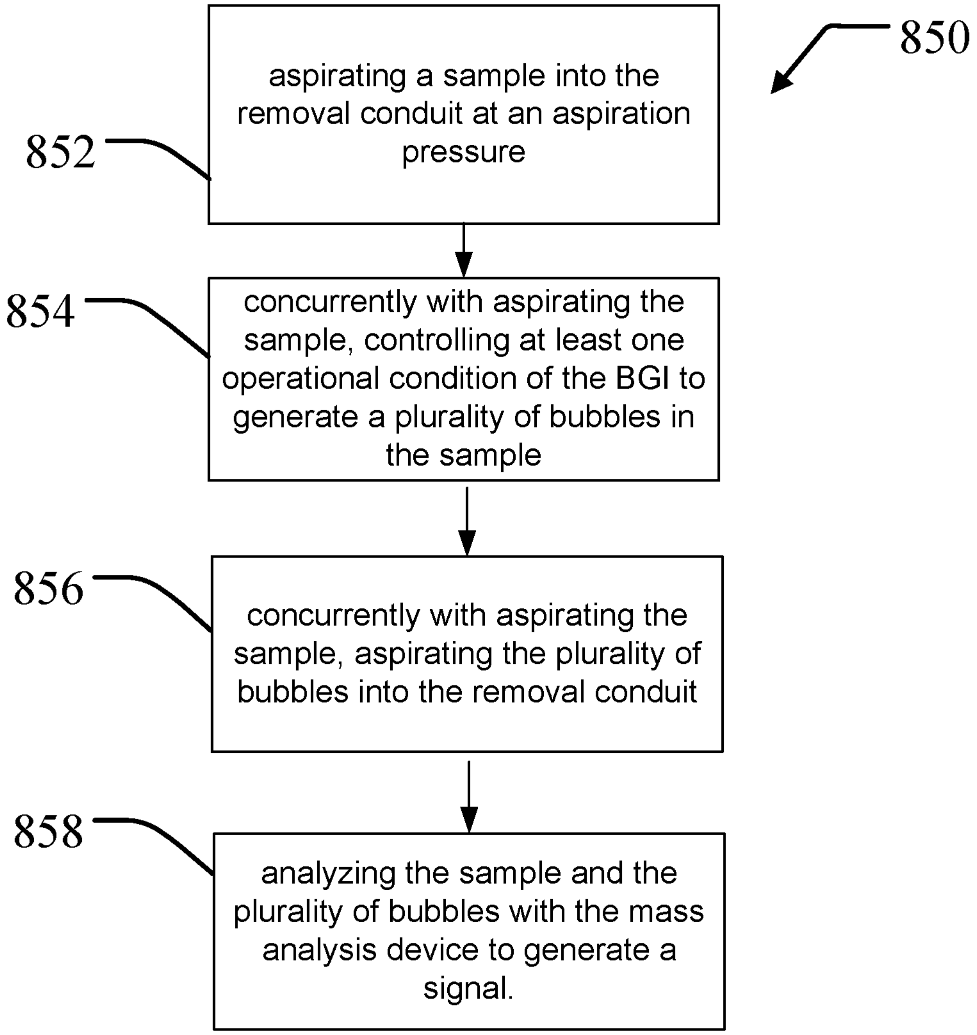

FIGS. 8A and 8B depict methods 800, 850 of analyzing a liquid with a mass analysis system. The liquid may be a sample liquid introduced directly to an BGI at a steady state. In either method 800, 850, the mass analysis system may include those depicted and described herein. In examples, the mass analysis device may be a mass spectrometry device, and an BGI may include a supply conduit, a port inlet, and a removal conduit. The method 800 begins with operation 802, operating the analysis system at a first bubble generation frequency condition comprising a first liquid inflow rate and a first aspiration pressure. This operation of the analysis system at the first bubble generation frequency condition may include the following operations 804, 806, and 808. Operation 804 includes delivering the liquid to the BGI at the first liquid inflow rate. This is the liquid that forms a meniscus proximate the port inlet. Operation 806 includes aspirating the liquid from the BGI via the removal conduit at the first aspiration pressure. This aspiration generates or introduces a plurality of bubbles in the removal conduit at the first bubble generation frequency. In examples, the plurality of bubbles are drawn into the BGI via a port inlet and may extend towards or into the removal conduit, for example as depicted in FIGS. 2A-2C, 4A-4C, and 6A-6D, above. Operation 808 includes detecting a signal associated with the liquid and the plurality of bubbles generated at the first bubble generation frequency at the mass analysis device. This signal may be displayed to a user of the mass analysis system, which would enable ongoing adjustment and monitoring of the system. The technologies described herein, however, may also be automated. For example, the mass analysis system may identify a characteristic within the signal, which may include one or more of a signal frequency, a signal intensity, a signal pattern, a noise. These characteristics enable the mass analysis system to identify a particular one of several liquid sample sources, or may detect a single sample being subjected to different ionization processes. The advantages of distinguishing multiple samples or ionization sources are described elsewhere herein. Once identified, characteristics such as noise may also be removed from subsequent tests of the sample.

One or more adjustments may be made (e.g., adjustments may be performed by a user or technician) so as to change the bubble generation frequency. For example, the liquid may be delivered to the BGI at a second flow rate different than the first flow rate. In another example, the liquid may be aspirated from the BGI via the removal conduit at a second aspiration pressure. Additionally, a separation distance between the port inlet and the removal conduit may be adjusted. Other ways to adjust the bubble generation frequency are contemplated and described elsewhere in the present document. The above three operations, however, are most likely to be utilized within a particular commercial implementation of the technology. Subsequent to one or more of the referenced adjustment processes, operation 810 is performed, and includes operating the analysis system at a second bubble generation frequency condition different than the first bubble generation frequency condition. Operation 810 includes operation 812, which includes detecting a signal associated with the liquid and the plurality of bubbles generated at the second bubble generation frequency at the mass analysis device.

The method 850 begins with operation 852, aspirating a sample into the removal conduit at an aspiration pressure. As described previously, this sample may be introduced into the BGI through an inlet discrete from the port inlet (e.g., from the reservoir depicted in FIG. 1, or other sample source). In other examples, a plurality of samples and sample sources may be introduced, e.g., in conjunction with a system that includes multiple BGIs. Concurrently with aspirating the sample, operation 854 is performed, controlling at least one operational condition of the BGI to generate a plurality of bubbles in the sample. Numerous operational conditions are described herein, and may include, but not be limited to, adjusting at least one of the aspiration pressure at the BGI, a liquid inflow rate of the sample to the BGI, a distance between an BGI port inlet and the removal conduit, the BGI port inlet diameter, the removal conduit diameter, and the BGI material. Concurrently with aspirating the sample, operation 856, aspirating the plurality of bubbles into the removal conduit, is performed. In examples, the bubbles are aspirated through a port inlet of the BGI (e.g., discrete from the introduction location of the sample itself). The bubbles may be aspirated at a uniform frequency. Thereafter, operation 858, analyzing the sample and the plurality of bubbles with the mass analysis device to generate a signal, is performed. Analysis of the sample may be preceded by ionization of the sample, for example, at least one or both of ESI and APCI may be utilized. By analyzing the sample a characteristic in the signal may be identified and further processed or otherwise manipulated. Example characteristics are described herein and may include one or more of a signal frequency, a signal pattern, signal intensity and a noise.

Figure 9:
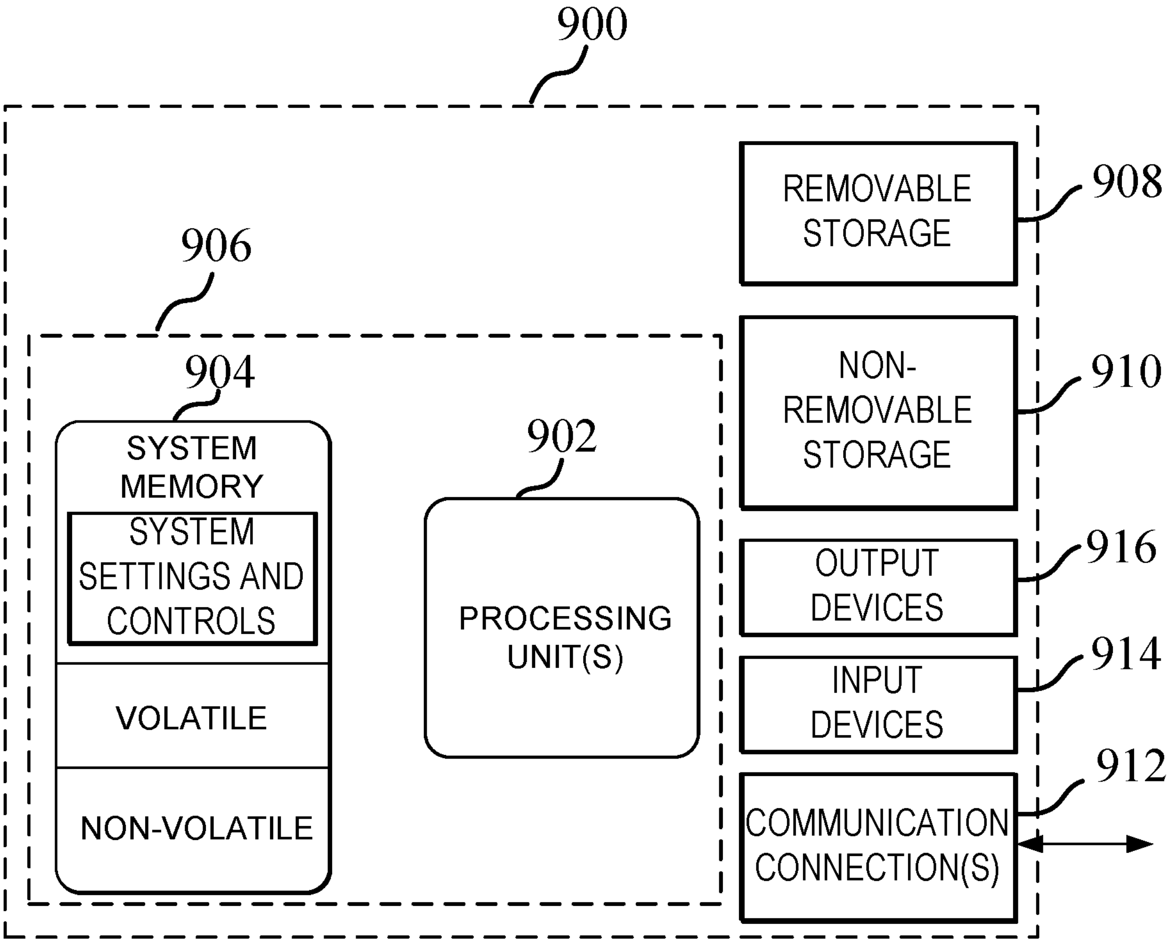
FIG. 9 depicts an example of a suitable operating environment in which one or more of the present examples can be implemented.

FIG. 9 depicts one example of a suitable operating environment 900 in which one or more of the present examples can be implemented. This operating environment may be incorporated directly into the controller for a mass spectrometry system, e.g., such as the controller depicted in FIG. 1. This is only one example of a suitable operating environment and is not intended to suggest any limitation as to the scope of use or functionality. Other well-known computing systems, environments, and/or configurations that can be suitable for use include, but are not limited to, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like.

In its most basic configuration, operating environment 900 typically includes at least one processing unit 902 and memory 904. Depending on the exact configuration and type of computing device, memory 904 (storing, among other things, instructions to control the eject the samples, adjust an aspiration pressure or inflow flow rate, or perform other methods disclosed herein) can be volatile (such as RAM), non-volatile (such as ROM, flash memory, etc.), or some combination of the two. This most basic configuration is illustrated in FIG. 9 by dashed line 906. Further, environment 900 can also include storage devices (removable, 908, and/or non-removable, 910) including, but not limited to, magnetic or optical disks or tape. Similarly, environment 900 can also have input device(s) 914 such as touch screens, keyboard, mouse, pen, voice input, etc., and/or output device (s) 916 such as a display, speakers, printer, etc. Also included in the environment can be one or more communication connections 912, such as LAN, WAN, point to point, Bluetooth, RF, etc.

Operating environment 900 typically includes at least some form of computer readable media. Computer readable media can be any available media that can be accessed by processing unit 902 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 900 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some examples, the components described herein include such modules or instructions executable by computer system 900 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, computer system 900 is part of a network that stores data in remote storage media for use by the computer system 900.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A method of analyzing a liquid with an analysis system comprising a mass analysis device and a bubble generating interface (BGI) comprising a supply conduit, a port inlet, and a removal conduit, the method comprising:

- operating the analysis system at a first bubble generation frequency condition comprising a first liquid inflow rate and a first aspiration pressure, wherein operating the analysis system at the first bubble generation frequency condition comprises:
  - delivering the liquid to the BGI through the supply conduit at the first liquid inflow rate, wherein the liquid forms a meniscus proximate the port inlet;
  - aspirating the liquid from the BGI via the removal conduit at the first aspiration pressure, so as to generate a plurality of bubbles in the removal conduit at the first bubble generation frequency; and
  - detecting a signal associated with the liquid and the plurality of bubbles generated at the first bubble generation frequency at the mass analysis device; and
- operating the analysis system at a second bubble generation frequency condition different than the first bubble generation frequency condition, wherein operating the analysis system at the second bubble generation frequency condition comprises:
  - detecting a signal associated with the liquid and the plurality of bubbles generated at the second bubble generation frequency at the mass analysis device.

2. The method of claim 1, wherein, prior to operating the analysis system at the second bubble generation frequency condition, performing at least one of:

- delivering the liquid to the BGI at a second flow rate;
- aspirating the liquid from the BGI via the removal conduit at a second aspiration pressure; and
- adjusting a separation distance between the port inlet and the removal conduit.

3. The method of claim 1, wherein the meniscus extends into a removal conduit.

4. The method of claim 1, wherein the liquid comprises a sample.

5. The method of claim 1, further comprising, after detecting the signal associated with the liquid and the plurality of bubbles generated at the first bubble generation frequency condition, displaying the signal.

6. The method of claim 1, further comprising identifying a characteristic in the signal, wherein the characteristic comprises at least one of a signal frequency, a signal pattern, a signal intensity, a noise.

7. The method of claim 6, further comprising associating the characteristic with at least one of a plurality of sample sources.

8. A method of analyzing a liquid with a mass analysis device comprising a bubble generating interface (BGI) comprising a removal conduit, the method comprising:

- aspirating a sample into the removal conduit at an aspiration pressure;
- concurrently with aspirating the sample, controlling at least one operational condition of the BGI to generate a first plurality of bubbles in the sample at a first bubble generation frequency;
- concurrently with aspirating the sample, aspirating the first plurality of bubbles into the removal conduit;
- analyzing the sample and the first plurality of bubbles with the mass analysis device to generate a first signal;
- controlling at least one operational condition of the BGI to generate a second plurality of bubbles in the sample at a second bubble generation frequency; and
- analyzing the sample and the second plurality of bubbles with the mass analysis device to generate a second signal.

9. The method of claim 8, wherein at least the first plurality of aspirated bubbles are aspirated at a uniform frequency.

10. The method of claim 8, wherein analyzing the sample and the first plurality of bubbles comprises identifying a characteristic in the first signal, wherein the characteristic comprises at least one of a signal frequency, a signal pattern, signal intensity, a noise.

11. The method of claim 8, wherein controlling at least one operational condition of the BGI comprises adjusting at least one of the aspiration pressure at the BGI, a liquid inflow rate of the sample to the BGI, a distance between a BGI port inlet and the removal conduit, the BGI port inlet diameter, the removal conduit diameter, and the BGI material.

12. The method of claim 8, wherein at least the first plurality of bubbles are aspirated through a port inlet of the BGI.

13. The method of claim 12, further comprising introducing the sample into the BGI through an inlet discrete from the port inlet.

14. The method of claim 13, wherein the discrete inlet comprises a plurality of discrete inlets and the sample comprises a plurality of samples.

15. The method of claim 8, further comprising, prior to analyzing the sample and the first plurality of bubbles, ionizing the sample utilizing at least one of electrospray ionization and atmospheric-pressure chemical ionization.

16. An apparatus comprising:

- a bubble generating interface (BGI) comprising a port inlet and a removal conduit;
- an ionization device communicatively coupled to the BGI;
- a mass analysis device disposed proximate the ionization device;
- at least one processor; and
- a memory storing instructions that, when executed by the at least one processor, cause the apparatus to perform operations comprising:
  - aspirating a sample into the removal conduit at an aspiration pressure;
  - concurrently with aspirating the sample, controlling at least one operational condition of the BGI to generate a first plurality of bubbles in the sample at a first bubble generation frequency;
  - concurrently with aspirating the sample, aspirating the first plurality of bubbles into the removal conduit, wherein the plurality of bubbles are aspirated at an aspiration frequency;
  - analyzing the sample and the plurality of bubbles with the mass analysis device to generate a first signal;

controlling at least one operational condition of the BGI to generate a second plurality of bubbles in the sample at a second bubble generation frequency; and analyzing the sample and the second plurality of bubbles with the mass analysis device to generate a second signal.

17. The apparatus of claim 16, wherein the BGI comprises a plurality of BGIs and the ionization device comprises a plurality of ionization devices.

18. The apparatus of claim 16, wherein the ionization device comprises both of an electrospray ionization device and an atmospheric-pressure chemical ionization device.

19. The apparatus of claim 16, wherein a separation distance between the port inlet and the removal conduit is adjustable.

20. The apparatus of claim 16, wherein the operations further comprise adjusting the aspiration frequency.

* * * * *